(12) United States Patent
Ma et al.

(10) Patent No.: US 12,289,442 B2
(45) Date of Patent: Apr. 29, 2025

(54) INTER PREDICTION METHOD, ENCODER, DECODER, AND STORAGE MEDIUM

(71) Applicant: GUANGDONG OPPO MOBILE TELECOMMUNICATIONS CORP., LTD., Guangdong (CN)

(72) Inventors: Yanzhuo Ma, Guangdong (CN); Junyan Huo, Guangdong (CN); Shuai Wan, Guangdong (CN); Fuzheng Yang, Guangdong (CN); Qihong Ran, Guangdong (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 428 days.

(21) Appl. No.: 17/935,441

(22) Filed: Sep. 26, 2022

(65) Prior Publication Data

US 2023/0042640 A1 Feb. 9, 2023

Related U.S. Application Data

(63) Continuation of application No. PCT/CN2020/083342, filed on Apr. 3, 2020.

(51) Int. Cl.
*H04N 19/105* (2014.01)
*H04N 19/159* (2014.01)
(Continued)

(52) U.S. Cl.
CPC ......... *H04N 19/105* (2014.11); *H04N 19/159* (2014.11); *H04N 19/176* (2014.11); *H04N 19/88* (2014.11)

(58) Field of Classification Search
CPC .. H04N 19/105; H04N 19/159; H04N 19/176; H04N 19/88; H04N 19/52
See application file for complete search history.

(56) References Cited

U.S. PATENT DOCUMENTS

2018/0103273 A1* 4/2018 Guo .................. H04N 19/159

FOREIGN PATENT DOCUMENTS

| CN | 102484706 A | 5/2012 |
|----|-------------|--------|
| CN | 107181955 B | 3/2020 |
| WO | 2019246535 A1 | 12/2019 |

OTHER PUBLICATIONS

Chang et al. "Non-CE4: On triangle merge mode," 126. MPEG Meeting; Mar. 25-Mar. 29, 2019; Geneva; (Motion Picture Expert Group or ISO/IEC JTC1/SC29/WG11), No. m47109, Mar. 13, 2019, XP030210718 (Year: 2019).*

(Continued)

*Primary Examiner* — Sath V Perungavoor
*Assistant Examiner* — Tyler B Edwards
(74) *Attorney, Agent, or Firm* — PERKINS COIE LLP

(57) ABSTRACT

An inter prediction method comprising: determining a prediction mode parameter of a current block which indicates using a GPM to determine an inter prediction value of the current block, obtaining a merge motion information candidate list, wherein the merge motion information candidate list comprises one or more motion candidate information item and the motion candidate information item comprises one or two motion vector; generating a GPM motion information candidate list by using the motion vectors included in the motion candidate information items according to a sequence of the motion candidate information items in the merge motion information candidate list comprises a motion vector; selecting, from the GPM motion information candidate list, a first motion vector of a first partition and a second motion vector of a second partition in the current block; and determining the inter prediction value by using the first motion vector and the second motion vector.

20 Claims, 9 Drawing Sheets

(51) Int. Cl.
H04N 19/176 (2014.01)
H04N 19/88 (2014.01)

(56) References Cited

OTHER PUBLICATIONS

Notice of Review Opinions issued in corresponding TW application No. 110109411 dated Aug. 21, 2024. 24 pages (with English translation).
Y-J Chang (Qualcomm) et al:"Non-CE4: On triangle merge mode", 126.MPEG Meeting; Mar. 25-Mar. 29, 2019; Geneva;(Motionpicture Expert Group or ISO/IEC JTC1/SC29/WG11), JVET-N0447-V1, Mar. 13, 2019. URL:http://phenix.int-evry.fr/mpeg/doc_end_user/documents/126_Geneva/wg11/m47109-JVET-N0447-v1-JVET-N0447-v1.zip JVET-NO447-v1/JVET-N0447.docx.
T-D Chuang et al:"CE10-related: Simplification of triangle merging candidate list derivation", 13.JVET Meeting; Jan. 9-Jan. 18, 2019; Marrakech; (The Jointvideo Exploration Team of ISO/IEC JTC1/SC29/WG11 and ITU-TSG.16), JVET-M0184-v1, Jan. 2, 2019. URL:http://phenix.int-evry.fr/jvet/doc_end_user/documents/13_Marrakech/wg11/JVET-M0184-v1.zip JVET-M0184-v1.docx.
The extended European search report issued in corresponding EP application No. 20929510.4 dated Mar. 24, 2023.
Zhang, Li et al. CE4-4.4: Merge list construction for triangular prediction mode Joint Video Experts Team (JVET) of ITU-T SG 16 WP 3 and ISO/IEC JTC 1/SC 29/WG 11 14th Meeting: Geneva, CH, Mar. 27, 2019. 3 pages.
Zhang, Li et al. CE10-related: Merge list construction process for triangular prediction mode Joint Video Experts Team (JVET) of ITU-T SG 16 WP 3 and ISO/IEC JTC 1/SC 29/WG 11 13th Meeting: Marrakech, MA, Jan. 18, 2019. 4 pages.
Solovyev, Timofey et al. CE4-related: Simplification for merge list derivation in triangular prediction mode on top of test CE4-4.6.b Joint Video Experts Team (JVET) of ITU-T SG 16 WP 3 and ISO/IEC JTC 1/SC 29/WG 11 14th Meeting: Geneva, CH, Mar. 27, 2019. 4 pages.
Esenlik, Semih et al. Non-CE4: Geometrical partitioning for inter blocks Joint Video Experts Team (JVET) of ITU-T Sg 16 WP 3 and ISO/IEC JTC 1/SC 29/WG 11 15th Meeting: Gothenburg, SE, Jul. 12, 2019. 9 pages.
Wang, Xianglin et al. CE4-related: An improved method for triangle merge list construction Joint Video Experts Team (JVET) of ITU-T SG 16 WP 3 and ISO/IEC JTC 1/SC 29/WG 11 14th Meeting: Geneva, CH, Mar. 27, 2019. 3 pages.
WIPO, International Search Report and Written Opinion for International Application No. PCT/CN2020/083342, Jan. 4, 2021. 14 pages.
Examination Report issued in corresponding EP application No. 20929510.4 dated Feb. 19, 2025. 8 pages.

* cited by examiner

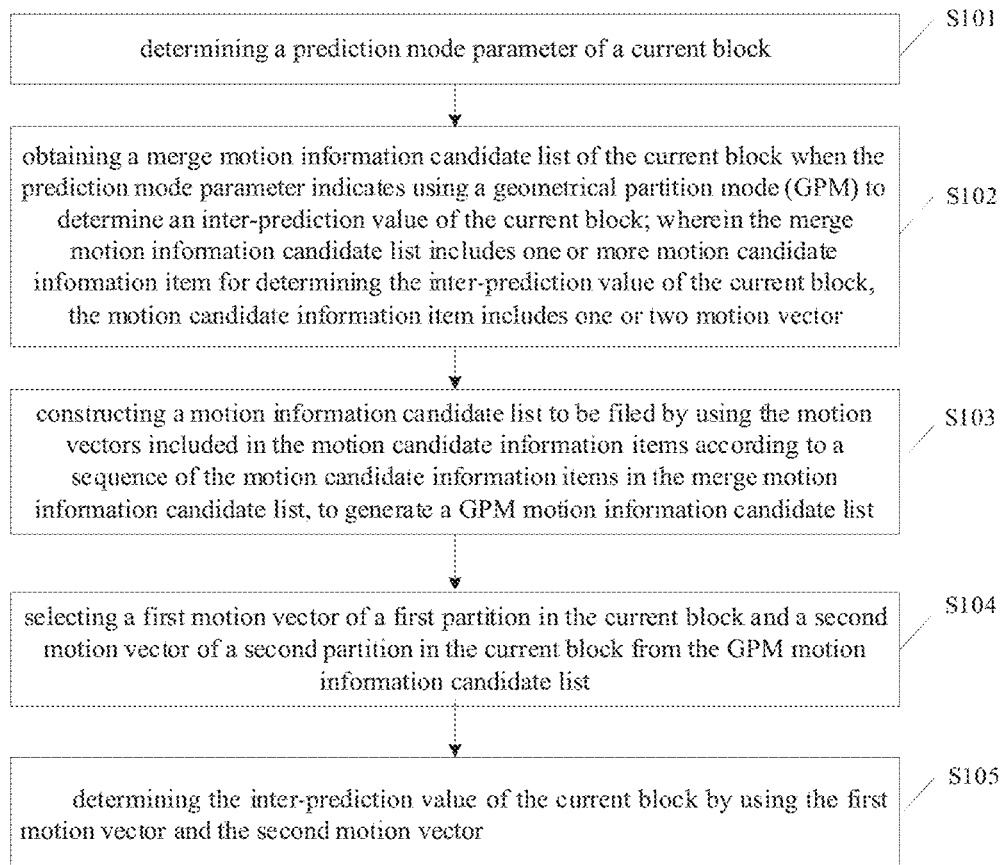
Fig. 3
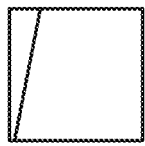 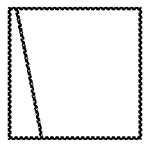 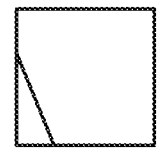 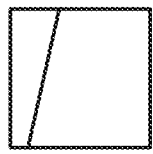
Fig. 4A      Fig. 4B      Fig. 4C      Fig. 4D
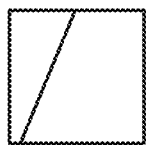 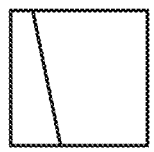 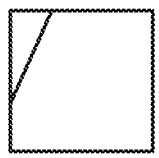
Fig. 4E      Fig. 4F      Fig. 4G

| 8 | 8 | 8 | 8 | 8 | 8 | 6 | 4 | 2 | 0 | 0 | 0 | 0 | 0 | 0 | 0 |
|---|---|---|---|---|---|---|---|---|---|---|---|---|---|---|---|
| 8 | 8 | 8 | 8 | 8 | 8 | 7 | 5 | 2 | 0 | 0 | 0 | 0 | 0 | 0 | 0 |
| 8 | 8 | 8 | 8 | 8 | 8 | 7 | 5 | 3 | 1 | 0 | 0 | 0 | 0 | 0 | 0 |
| 8 | 8 | 8 | 8 | 8 | 8 | 7 | 5 | 3 | 1 | 0 | 0 | 0 | 0 | 0 | 0 |
| 8 | 8 | 8 | 8 | 8 | 8 | 8 | 6 | 4 | 2 | 0 | 0 | 0 | 0 | 0 | 0 |
| 8 | 8 | 8 | 8 | 8 | 8 | 8 | 6 | 4 | 2 | 0 | 0 | 0 | 0 | 0 | 0 |
| 8 | 8 | 8 | 8 | 8 | 8 | 8 | 7 | 5 | 3 | 1 | 0 | 0 | 0 | 0 | 0 |
| 8 | 8 | 8 | 8 | 8 | 8 | 8 | 7 | 5 | 3 | 1 | 0 | 0 | 0 | 0 | 0 |
| 8 | 8 | 8 | 8 | 8 | 8 | 8 | 8 | 5 | 3 | 1 | 0 | 0 | 0 | 0 | 0 |
| 8 | 8 | 8 | 8 | 8 | 8 | 8 | 8 | 6 | 3 | 1 | 0 | 0 | 0 | 0 | 0 |
| 8 | 8 | 8 | 8 | 8 | 8 | 8 | 8 | 6 | 4 | 2 | 0 | 0 | 0 | 0 | 0 |
| 8 | 8 | 8 | 8 | 8 | 8 | 8 | 8 | 6 | 4 | 2 | 0 | 0 | 0 | 0 | 0 |
| 8 | 8 | 8 | 8 | 8 | 8 | 8 | 8 | 7 | 5 | 3 | 1 | 0 | 0 | 0 | 0 |
| 8 | 8 | 8 | 8 | 8 | 8 | 8 | 8 | 7 | 5 | 3 | 1 | 0 | 0 | 0 | 0 |
| 8 | 8 | 8 | 8 | 8 | 8 | 8 | 8 | 8 | 6 | 3 | 1 | 0 | 0 | 0 | 0 |
| 8 | 8 | 8 | 8 | 8 | 8 | 8 | 8 | 8 | 6 | 4 | 2 | 0 | 0 | 0 | 0 |

Fig. 9A

| 8 | 8 | 8 | 6 | 2 | 0 | 0 | 0 |
|---|---|---|---|---|---|---|---|
| 8 | 8 | 8 | 7 | 3 | 0 | 0 | 0 |
| 8 | 8 | 8 | 8 | 4 | 0 | 0 | 0 |
| 8 | 8 | 8 | 8 | 5 | 1 | 0 | 0 |
| 8 | 8 | 8 | 8 | 5 | 1 | 0 | 0 |
| 8 | 8 | 8 | 8 | 6 | 2 | 0 | 0 |
| 8 | 8 | 8 | 8 | 7 | 3 | 0 | 0 |
| 8 | 8 | 8 | 8 | 8 | 3 | 0 | 0 |

Fig. 9B

INTER PREDICTION METHOD, ENCODER, DECODER, AND STORAGE MEDIUM

CROSS-REFERENCE TO RELATED APPLICATION

The present application is a continuation application of the International PCT Application No. PCT/CN2020/083342, having an international filing date of Apr. 3, 2020, the entire content of which is hereby incorporated by reference.

TECHNICAL FIELD

The present disclosure relates to video coding technology, and more particularly, to an inter prediction method, an encoder, a decoder and a storage medium.

BACKGROUND

In the process of video coding and decoding, in addition to intra prediction, inter prediction can also be used when encoding or decoding a current block. Inter prediction can include motion estimation and motion compensation, and for motion compensation, Geometrical Partition Mode (GPM) can be used to divide the current block for inter prediction into two non-rectangular partitions and then weighting fusion is performed after prediction respectively, to obtain the predicted value of the current block.

In the prior art, in the GPM prediction process, a GPM motion information candidate list is needed to be constructed. The motion information candidate list is actually formed by selecting motion information from a conventional motion information candidate list in a parity check way.

However, the GPM motion information candidate list generated according to the parity check way has certain irrationality. The motion vectors included in the GPM motion information candidate list may not be suitable for inter prediction, correspondingly, when performing inter prediction, a better motion vector cannot be obtained from the GPM motion information candidate list for inter prediction, which causes a loss of predictive performance.

SUMMARY

The present disclosure provides an inter prediction method, an encoder, a decoder and a storage medium, which improve the reliability of GPM motion information candidate list, thereby the inter prediction performance and coding performance is improved.

In a first aspect, the present disclosure provides an inter prediction method, applied to an encoder, the method comprising:
  determining a prediction mode parameter of a current block;
  obtaining a merge motion information candidate list of the current block when the prediction mode parameter indicates using a geometrical partition mode (GPM) to determine an inter prediction value of the current block; wherein the merge motion information candidate list includes one or more motion candidate information item for determining the inter prediction value of the current block, and the motion candidate information item includes one or two motion vector;
  constructing a motion information candidate list to be filed by using the motion vectors included in the motion candidate information item according to a sequence of the motion candidate information item in the merge motion information candidate list, generating a GPM motion information candidate list, wherein the motion candidate information item in the GPM motion information candidate list comprises a motion vector;
  selecting a first motion vector of a first partition in the current block and a second motion vector signaling a second partition in the current block from the GPM motion information candidate list;
  determining the inter prediction value of the current block by using the first motion vector and the second motion vector.

In a second aspect, the present disclosure provides an inter prediction method, applied to a decoder, the method comprising:
  parsing a bitstream, determining a prediction mode parameter of a current block;
  obtaining a merge motion information candidate list of the current block when the prediction mode parameter indicates using a geometrical partition mode (GPM) to determine an inter prediction value of the current block; wherein the merge motion information candidate list includes one or more motion candidate information item for determining the inter prediction value of the current block, and the motion candidate information item includes one or two motion vector;
  constructing a motion information candidate list to be filed by using the motion vectors included in the motion candidate information items according to a sequence of the motion candidate information items in the merge motion information candidate list, and generating a GPM motion information candidate list, wherein the motion candidate information items in the GPM motion information candidate list comprises a motion vector;
  selecting a first motion vector of a first partition in the current block and a second motion vector of a second partition in the current block from the GPM motion information candidate list;
  determining the inter prediction value of the current block by using the first motion vector and the second motion vector.

In a third aspect, the present disclosure provides an encoder, comprising:
  a first determining unit, configured to determine a prediction mode parameter of a current block;
  a first obtaining unit, configured to obtain a merge motion information candidate list of the current block when the prediction mode parameter indicates using a geometrical partition mode (GPM) to determine an inter prediction value of the current block; wherein the merge motion information candidate list includes one or more motion candidate information item for determining the inter prediction value of the current block, and the motion candidate information item includes one or two motion vector;
  a first generating unit, configured to construct a motion information candidate list to be filed by using the motion vectors included in the motion candidate information items according to a sequence of the motion candidate information items in the merge motion information candidate list, and generate a GPM motion information candidate list, wherein the motion candidate information items in the GPM motion information candidate list comprises a motion vector;
  a first selecting unit, configured to select a first motion vector of a first partition in the current block and a second motion vector of a second partition in the current block from the GPM motion information candidate list;

a first predicting unit, configured to determine the inter prediction value of the current block by using the first motion vector and the second motion vector.

In a fourth aspect, the present disclosure provides a decoder, comprising:

a parsing unit, configured to parse a bitstream, determine a prediction mode parameter of a current block;

a second obtaining unit, configured to obtain a merge motion information candidate list of the current block when the prediction mode parameter indicates using a geometrical partition mode (GPM) to determine an inter prediction value of the current block; wherein the merge motion information candidate list includes one or more motion candidate information item for determining the inter prediction value of the current block, and the motion candidate information item includes one or two motion vector;

a second generating unit, configured to construct a motion information candidate list to be filed by using the motion vectors included in the motion candidate information items according to a sequence of the motion candidate information items in the merge motion information candidate list, and generate a GPM motion information candidate list, wherein the motion candidate information items in the GPM motion information candidate list comprising one motion vector;

a second determining unit, configured to select a first motion vector of a first partition in the current block and a second motion vector of a second partition in the current block from the GPM motion information candidate list;

a second predicting unit, configured to determine the inter prediction value of the current block by using the first motion vector and the second motion vector.

In a fifth aspect, the present disclosure provides an encoder, comprising:

a first memory and a first processor;

the first memory stores a computer program that can run on the first processor, and the inter prediction method of the encoder is implemented when the first processor executes the computer program.

In a sixth aspect, the present disclosure provides a decoder, comprising:

a second memory and a second processor;

the second memory stores a computer program that can be run on the second processor, and the inter prediction method of the decoder is implemented when the second processor executes the computer program.

In a seventh aspect, the present disclosure provides a storage medium, comprising:

a computer program is stored thereon, and when the computer program is executed by a first processor, the inter prediction method of an encoder is implemented; or, the computer program is executed by a second processors, the inter prediction method of a decoder is implemented.

The present disclosure provides an inter prediction method, an encoder, a decoder and a storage medium, comprising: determining a prediction mode parameter of a current block; obtaining a merge motion information candidate list of the current block when the prediction mode parameter indicates using a geometrical partition mode (GPM) to determine an inter prediction value of the current block; wherein the merge motion information candidate list includes one or more motion candidate information item for determining the inter prediction value of the current block, the motion candidate information item includes one or two motion vector; constructing a motion information candidate list to be filed by using the motion vectors included in the motion candidate information items according to a sequence of the motion candidate information items in the merge motion information candidate list, and generating a GPM motion information candidate list, wherein the motion candidate information items in the GPM motion information candidate list comprising one motion vector; selecting a first motion vector of a first partition in the current block and a second motion vector of a second partition in the current block from the GPM motion information candidate list; determining the inter prediction value of the current block by using the first motion vector and the second motion vector. The technical solution provided by the embodiments of the present disclosure takes a motion vector in the merge motion information candidate list as one item, and uses the motion vectors to construct the GPM motion information candidate list according to the sequence of the motion vectors in the merge motion information candidate list, which improves the reliability of GPM motion information candidate list, thereby the inter prediction performance and coding performance is improved.

BRIEF DESCRIPTION OF DRAWINGS

FIG. 3 is a flowchart of an inter prediction method according to an exemplary embodiment;

FIG. 4A-4G are diagrams of examples of 7 partition modes according to an exemplary embodiment;

FIG. 9A is a diagram of an example of a first weight value of luma according to an exemplary embodiment;

FIG. 9B is a diagram of an example of a first weight value of chroma according to an exemplary embodiment;

DETAILED DESCRIPTION

Figure 1:
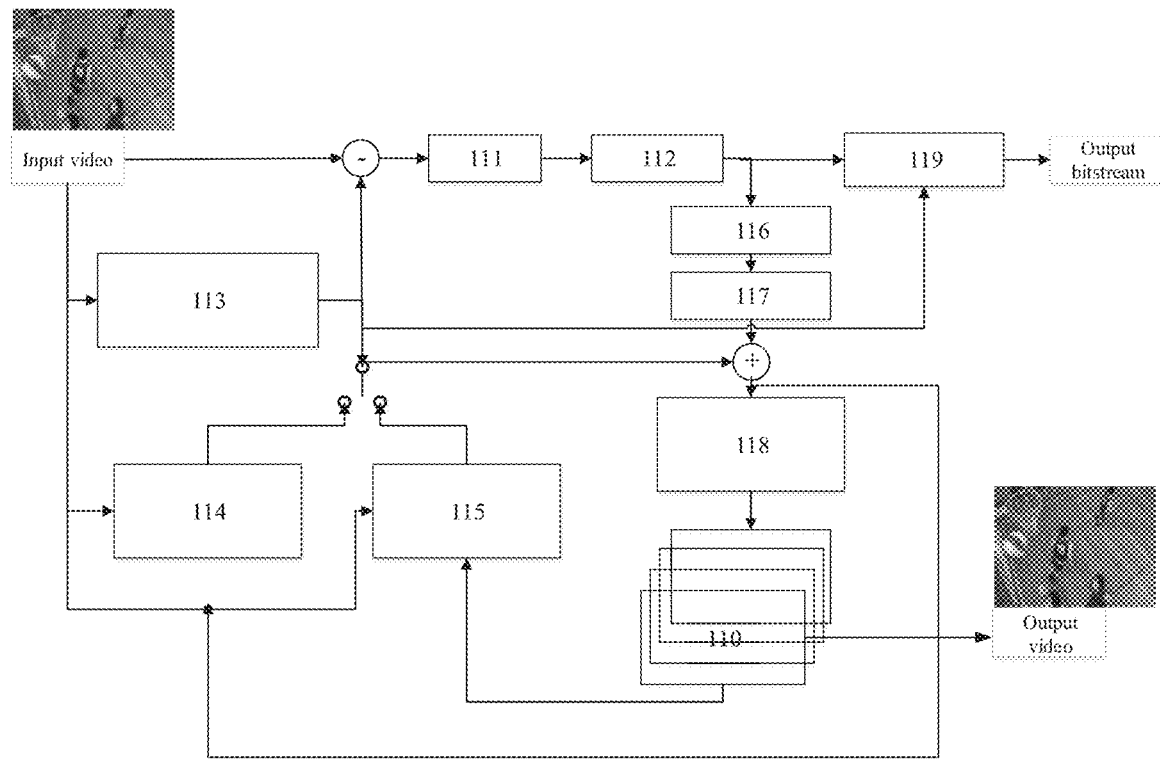
FIG. 1 is a system structure diagram of a video encoding system according to an exemplary embodiment.

The present disclosure provides a video encoding system, as shown in FIG. 1, the video encoding system 11 comprises:

a transform unit 111, a quantization unit 112, a mode selection and encoding control logic unit 113, an intra prediction unit 114, an inter prediction unit 115 (including motion compensation and motion estimation), an inverse quantization unit 116, an inverse transform unit 117, a loop filtering unit 118, an encoding unit 119, and a decoded image buffer unit 110. For an input original video signal, a video reconstruction block can be obtained through partitioning of a coding tree unit (CTU), an encoding mode is determined through the mode selection and coding control logic unit 113, and then a residual sample information is obtained after intra or inter prediction, a transform process is performed on the video reconstruction block through the transform unit 111 and the quantization unit 112 which includes transforming the residual information from the pixel domain to the transform domain, and quantizing the transform coefficients to further reduce the bit rate, the intra prediction unit 114 is used to perform intra prediction on the video reconstruction block. The intra-prediction unit 114 is configured to perform intra prediction on the video reconstruction block; wherein the intra prediction unit 114 is configured to determine an optional intra prediction mode (ie, target prediction mode). The inter prediction unit 115 is configured to perform inter prediction coding on the received video reconstruction block relative to one or more block in one or more reference frame (picture) to provide a time prediction information; wherein motion estimation is a process of generating motion vectors, which can estimate the motion of the video reconstruction block, and then motion compensation is performed based on the motion vector determined by the motion estimation. After the inter prediction mode is determined, the inter prediction unit 115 is also configured to provide the selected inter prediction data to the encoding unit 119, and also to send the calculated motion vector data to the encoding unit 119. In addition, the inverse quantization unit 116 and the inverse transform unit 117 is configured to reconstruct the video reconstruction block, reconstruct the residual block in the pixel domain, the block artifacts of the reconstructed residual block is removed through the loop filter unit 118, and then the reconstructed residual block is added to a prediction block in the picture of the decoded image buffer unit 110 to generate a reconstructed video reconstruction block; the encoding unit 119 is configured to encode various encoding parameters and quantized transform coefficients. The decoded image buffer unit 110 is used to store the reconstructed video reconstruction block for prediction reference. Along with the video image encoding progresses, the new reconstructed video reconstruction blocks will be continuously generated, and these reconstructed video reconstruction blocks will all be stored in the decoded image buffer unit 110.

Figure 2:
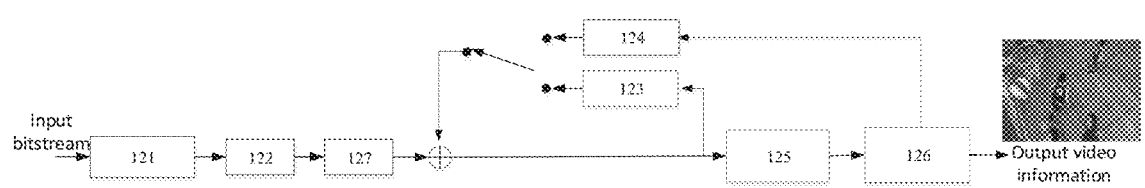
FIG. 2 is a system structure diagram of a video decoding system according to an exemplary embodiment.

The present disclosure provides a video decoding system, FIG. 2 is a schematic diagram of the composition structure of a video decoding system according to an embodiment of the present disclosure, as shown in FIG. 2, the video decoding system 12 comprises:

a decoding unit 121, an inverse transform unit 127, an inverse quantization unit 122, an intra prediction unit 123, a motion compensation unit 124, a loop filter unit 125, and a decoded image buffer unit 126. A bitstream of the video signal is output after encoding an input video signal through the video encoding system 11, the bitstream is input into the video decoding system 12, firstly, decoded transform coefficients are obtained through the decoding unit 121; a residual Hock in the pixel domain is generated by processing on the transform coefficients through the inverse transform unit 127 and the inverse quantization unit. The intra prediction unit 123 can be configured to generate prediction data of the current video decoding block based on the determined intra prediction direction and data from the previous decoded block of the current frame or picture; the motion compensation unit 124 determines the prediction information for the video decoding block by analyzing the motion vector and other associated syntax elements, and uses the prediction information to generate the prediction block of the current video decoding block. The residual block from the inverse transform unit 127 and the inverse quantization unit 122 is summed with the prediction block generated from intra prediction unit 123 and the motion compensation unit 124, to form a decoded video block; the block artifacts of the decoded video signal is removed through the loop filter unit 125, which can improve the video quality; and then the decoded video blocks are stored in the decoded image buffer unit 126, and the decoded image buffer unit 126 stores reference pictures for subsequent intra prediction or motion compensation, and also configured to input of video output to obtain a restored original video signal.

The inter prediction method provided by the embodiment of the present disclosure mainly acts on the inter prediction unit 215 of the video encoding system 11 and the inter prediction unit of the video decoding system 12, that is, the motion compensation unit 124. That is to say, a better prediction effect can be obtained in the video encoding system 11 through the inter prediction method provided in the embodiments of the present disclosure, and correspondingly, at the decoding end, restoration quality of the video decoding can also be improved.

Based on this, the technical solution of the present disclosure will be further elaborated in detail below combining with the drawings and embodiments. Before elaborating in detail, it should be noted that the "first", "second", "third", etc. mentioned throughout the specification are only for distinguishing different features and do not limiting priority, order, size relationship and so on.

The embodiment of the present disclosure provides an inter prediction method, which is applied to a video encoding device, that is, an encoder. The functions implemented by the method can be implemented by the processor in the video encoding device calling program codes. Of course, the program code can be stored in a computer storage medium. It can be seen that the video encoding device comprises at least a processor and a storage medium.

FIG. 3 is a schematic diagram of the implementation process of an intra prediction method provided by an embodiment of the present disclosure. As shown in FIG. 3, the method comprises:

S101. determining a prediction mode parameter of the current block.

In the embodiments of the present disclosure, a video picture can be partitioned into multiple picture blocks, and each current picture block to be encoded can be called a coding block (CB), where each coding block can include a first colour component, a second colour component and a third colour component; and the current block is a coding block in the video picture for which prediction of the first colour component, the second colour component, or the third colour component is to be performed currently.

Wherein, it is assumed that the current block performs the first colour component prediction, and the first colour component is a luma component, that is, the colour component to be predicted is the luma component, then the current block can also be called a luma block; or, it is assumed that the current block performs the second colour component prediction, and the second colour component is a chroma component, that is, the colour component to be predicted is a chroma component, then the current block can also be called a chroma block.

It should also be noted that the prediction mode parameter indicates a coding mode of the current block and parameters related to the coding mode. Generally, a rate-distortion optimization (RDO) method can be used to determine the prediction mode parameters of the current block.

Specifically, in some embodiments, the encoder determines the prediction mode parameters of the current block is implemented as follows: the encoder determines the colour components to be predicted for the current block; performs prediction coding on Me colour component to be predicted by using multiple prediction modes based on the parameters of the current block, calculates the rate-distortion cost results of each prediction mode in multiple prediction modes; selects the minimum rate-distortion cost result from the calculated multiple rate-distortion cost results, and takes the prediction mode corresponding to the minimum rate-distortion cost result as the prediction mode parameter of the current block.

That is to say, on the encoder end, multiple prediction modes can be used for the current block to encode the colour components to be predicted respectively. Here, multiple prediction modes usually include traditional intra prediction modes and non-traditional intra prediction modes, wherein traditional intra prediction modes can include direct current (DC) mode, planar (PLANAR) mode, angular mode, etc., and non-traditional intra prediction modes can include MIP mode, Cross-component Linear Model Prediction (CCLM) mode, Intra Block Copy (IBC) mode and PLT (Palette) mode, etc., the inter prediction mode can include: geometrical partition mode (GEO), triangular prediction mode (TPM), etc.

In this way, after encoding the current block with multiple prediction modes, the rate-distortion cost result of each prediction mode can be obtained; then the minimum rate-distortion cost: result is selected from the obtained multiple rate-distortion cost results, and the prediction mode corresponding to the minimum rate-distortion cost result is determined as the prediction mode parameter of the current block. In this way, the determined prediction mode can be used to encode the current block, and in this prediction mode, the prediction residual can be made small, which can improve coding efficiency.

S102. obtaining a merge motion information candidate list of the current block when the prediction mode parameter indicates determining an inter prediction value of the current block by using a geometrical partition mode (GPM); wherein the merge motion information candidate list includes one or more motion candidate information item for determining the inter prediction value of the current block, the motion candidate information includes one or two motion vector.

In the embodiment of the present disclosure, when the prediction mode parameter indicates determining an inter prediction value of the current block by using a geometrical partition mode (GPM), the merge motion information candidate list of the current block can be obtained. Wherein, the current block in the embodiment of the present disclosure refers to an inter-block.

It should be noted that in this embodiment of the disclosure, the use of GPM for the current block has following restrictions: a sequence layer parameter set (sps) allows the use of GPM; the current block is belonged to a bidirectional prediction slice; the width and height of the current block are both greater than or equal to 8 and less than or equal to 64, and width to height ratio and height to width ratio of the current block are both less than 8; the current block is not general merged prediction, non-merge subblock prediction, non-affine prediction, or non-composed intra inter prediction (CIIP); GPM is disabled for chroma component in the 4:0:0 format.

It should be noted that, in the embodiment of the present disclosure, the inter prediction is a process of generating the prediction value of the current block through a motion vector indicating the position of the samples used for prediction in the reference picture based on the samples in the reference picture of the current block. The reference picture is a picture or frame of a short-term reference picture or a long-term reference picture, and the reference picture contains samples that can be used for inter prediction in the decoding process of subsequent pictures in the decoding order.

Merge: an inter-coding method, that the motion vector is not directly transmitted in the bitstream. The current block can select motion information corresponding to the merge index from the merge candidate list according to the merge index, and take the merge candidate motion information as the motion information of the current block, or take the merge candidate motion information after scaling as the motion information of the current block; the current block determines the inter prediction value according to the motion information.

Generally, the pictures of a video sequence are partitioned into picture blocks for encoding. In the video coding hybrid framework, coding techniques such as prediction, transformation, and quantization are usually implemented in units of square and rectangular blocks. However, in practice, the edges of moving objects are not necessarily horizontal or vertical, even if they are, they may not be exactly on the edge of the block that can be partitioned, and the motion vectors: on both sides of the moving edge are often different, so performing motion prediction and compensation in a whole block is prone to large prediction errors in the encoding process, which leads to limited coding efficiency.

It should be noted that, in the embodiment of the present disclosure, GPM divides the inter block (ie, the current block) into two non-rectangular sub-partitions for the edge part of the object in the picture, and then performs weighted after prediction respectively. For example, the non-rectangular form can be as shown in FIGS. 4A-4G below.

Wherein, in the current VVC Draft 7 version, GPM has 82 partition modes totally. Each division mode corresponds to an angle $\alpha$ and a step lengths $\rho$. The angle is partitioned into 24 kinds of 360 degrees, therefore, there are 24 kinds of angles. There are 4 kinds of step lengths. So there are 96 kinds of combinations of angles and step lengths.

It should be noted that the angle table replaces the previous angle table based on a fixed step length with a slope-based angle table, and uses 5 fixed slopes (1, ½, ¼, 4, 2) to construct angle table with different intervals.

Figure 5:
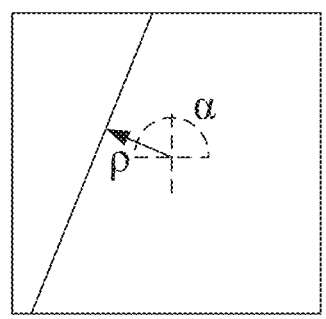
FIG. 5 is a diagram of an example of an angle and step length of the current block according to an exemplary embodiment.

Exemplarily, as shown in FIG. 5, the combination of each angle $\alpha$ and step length $\rho$ constitutes a partition mode (wherein, 82 partition modes are obtained by eliminating all the first step length with angle indexes 0, 6, 12 to 23), GPM partitions the current block into two non-rectangular sub-partitions, and each sub-partition performs unidirectional motion compensation separately and obtains a unidirectional prediction value, and obtains the final GPM predicted value of the current block finally by using the weight matrix of the current block, performs weighted fusion on the unidirectional prediction values of the two partitions.

In this embodiment of the present disclosure, in the encoder end, when it is determined that GPM is used for inter prediction, the encoder can obtain the merge motion information candidate list of the current block, wherein the merge motion information candidate list is used to perform motion predictions for the current block.

Specifically, in the embodiment of the present disclosure, the encoder acquiring the merge motion information candidate list of the current block comprises: obtaining one or more reference block of the current block; acquiring a motion vector of the reference block in one or more preset direction and obtaining the motion candidate information; arranging the motion candidate according to a preset arrangement manner and obtaining the merge motion information candidate list.

Figure 6:
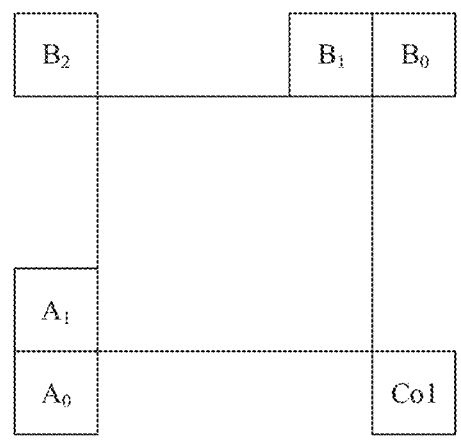
FIG. 6 is a configuration diagram of an example of the reference blocks according to an exemplary embodiment.

Exemplarily, as shown in FIG. 6, the encoder can use the current block as a baseline, and take the top neighboring block B1, the left neighboring block A1, the top right neighboring block B0, and the left bottom neighboring block A0, the top left neighboring block B2 of the current block, and the collocated block of the reference picture col as the reference blocks sequentially. In addition, a reference block may also be a historical coding block, etc., which is not limited in the embodiment of the present disclosure.

Exemplarily, in the embodiment of the present disclosure, the encoder can obtain the motion vector information of the reference block in two preset directions, and the two preset directions can be selected according to actual needs, which is not limited in the embodiment of the present disclosure. Wherein, the two motion vectors of each reference block in the two preset directions are one item of the motion candidate information items in the merge motion information candidate list.

It should be noted that, in the embodiment of the present disclosure, when the encoder obtains the two motion vectors in the two preset directions of each reference block, the encoder can arrange the motion vectors in a preset sequence. And the preset sequence can be the motion vector information is arranged in sequence of the top neighboring block B1, the left neighboring block A1, the top right neighboring block B0, the left bottom neighboring block A0, the top left neighboring block B2, the collocated Hock of the reference picture col, and different sources of direction are distinguished here. Exemplarily, the merge motion information candidate list is shown in Table 1 below.

TABLE 1

| index | List0 | List1 |
|-------|-------|-------|
| 0 | 0 | 0 |
| 1 | 1 | 1 |
| 2 | 2 | 2 |
| 3 | 3 | 3 |
| 4 | 4 | 4 |

As shown in Table 1, in the embodiment of the present disclosure, 0-4 in the index column indicate different reference blocks corresponding to the current block respectively, and list0 and list1 indicate a preset direction respectively, each row can record two motion vector in two preset directions for a certain reference block of the current block, the indexes of the two motion vectors are the same, which belong to one item of motion candidate information, and correspondingly, for a reference block.

S103. constructing a motion information candidate list to be filed by using the motion vectors included in the motion candidate information items according to a sequence of the motion candidate information items in the merge motion information candidate list, generating a GPM motion information candidate list.

In the embodiment of the present disclosure, after the encoder obtaining the merge motion information candidate list, further, constructing a motion information candidate list to be filed by using the motion vectors included in the motion candidate information items according to a sequence of the motion candidate information items in the merge motion information candidate list, generating a GPM motion information candidate list.

Exemplarily, in this embodiment of the present disclosure, corresponding to the merge motion information candidate list shown in Table 1, the encoder can take each motion vector in the motion candidate information item as one item, fill into the motion information candidate list to be filled according to the sequence of the index 0-4, list0-list, thereby the GPM motion information candidate list of GPM motion information is generated shown in Table 2.

TABLE 2

| index | List0 | List1 |
|-------|-------|-------|
| 0 | 0 | 1 |
| 1 | 2 | 3 |
| 2 | 4 | 5 |
| 3 | 6 | 7 |
| 4 | 8 | 9 |

As shown in Table 2, each motion vector corresponds to a different index, that is, 0-9 filled in in Table 2. Each motion vector can be used as an independent item. The integer value obtained by rounding down the index is partitioned by 2 is its index in Table 1 actually. The parity of the index in Table 2 corresponds to the source of list0 or list1, respectively.

Specifically, in the embodiment of the present disclosure, the encoder constructs a motion information candidate list to be filed by using the motion vectors included in the motion candidate information items according to a sequence of the motion candidate information items in the merge motion information candidate list, generating a GPM motion information candidate list comprising: when the target motion vector is to be filled into the motion information candidate list according to the sequence in the merge motion information candidate list, determining whether the target motion vector is available or not; the target motion vector is a motion vector of any motion candidate information items in the more motion candidate information. When the target motion vector is not available, constructing the motion information candidate list to be filed by using the target motion vector is skipped; using the next motion vector arranged after the target motion vector in the merge motion information candidate list, continuing the construction of the motion information candidate list to be filed.

It can be understandable that in the embodiment of the present disclosure, the multiple motion vector information may include non-available motion vectors, that is, non-available motion vectors. Therefore, the encoder can skip the non-available motion vectors when filling the motion vectors as one item into the motion information candidate list to be filled according to the arrangement sequence, to improve the efficiency of subsequent information selection from the GPM motion information candidate list, and reduce the storage space occupied by the GPM motion information candidate list.

Specifically, in the embodiment of the present disclosure, the encoder constructs a motion information candidate list to be filed by using the motion vectors included in the motion candidate information items according to a sequence of the motion candidate information items in the merge motion information candidate list, generating a GPM motion information candidate list, comprising: determining the motion information candidate list to be filed as the GPM motion information candidate list when the number of the motion vector in the motion information candidate list to be filed reaches a preset number.

It should be noted that, in the embodiment of the present disclosure, the encoder stores a preset number of items, and the preset number of items can be selected according to actual needs, which is not limited in the embodiment of the present disclosure.

It is understandable that, in this embodiment of the present disclosure, the encoder can also fill some of the top-ranked motion vectors in the merge motion information candidate list into the motion information candidate list to be filled, and the top-ranked motion vectors are more reliable when performing inter prediction, which can not only reduce the complexity of the encoder, but also does not cause loss of coding efficiency.

Exemplarily, as shown in Table 3, two motion vectors in two preset directions corresponding to the first 3 reference blocks in the merge motion information candidate list can be sequentially filled into the motion information candidate list to be filled, thereby the GPM Motion information candidate list is generated.

TABLE 3

| index | List0 | List1 |
|---|---|---|
| 0 | 0 | 1 |
| 1 | 2 | 3 |
| 2 | 4 | 5 |
| 3 | | |
| 4 | | |

It should be noted that the current block of geometric partition prediction includes two partitions, each partition will only use a unidirectional prediction mode, and the merge motion information candidate list can contain bidirectional information; therefore, the encoder needs to perform information selection. Currently, the encoder selects a motion vector in one direction from the two motion vectors in the two preset directions for each reference block according to the parity check way, however, the discarded motion vector may also be more suitable when performing subsequent inter prediction. Therefore, in this embodiment of the present disclosure, the encoder determines a motion vector of the motion candidate information items in the merge motion information candidate list as an item directly, and constructs the motion information candidate list to be filled in sequence without performing parity checking. Thus the encoder can ensure the reliability of the GPM motion information candidate list when performing subsequent selections, which can improve the coding performance.

It should be noted that in the embodiment of the present disclosure, the encoder can also construct the GPM motion information candidate list directly. The construction process is similar to the construction process of the merge motion information candidate list. Same to the principle in the above steps S102 to S103, the encoder can check the availability of the motion vectors: in the two directions of each spatial neighbouring, temporal neighbouring, historical information, average value construction, and zero motion vector when obtaining the motion vectors included in the motion candidate information items of the merge motion information candidate list, and then fill into the motion information candidate list to be filled one by one by using the available items of these motion vectors, and generate the GPM motion information candidate list. Exemplarily, corresponding to the reference block shown in FIG. 6, the following sequence can be used to check and fill into the list one by one:
B1List0-B1List1-A1List0-A1List1-B0List0-B0List1-A0List0-A0List1-B2List0-B2List1-ColList0-ColList1-HisList0-HisList1-AvgList0-AvgList1-0.

It should be noted that in the embodiment of the present disclosure, a duplicate check and de-duplication operation can also be added in the process of constructing the motion information candidate list to be filled by using the motion vectors, to ensure the diversity of the GPM motion information candidate list finally.

Specifically, in the embodiment of the present disclosure, the encoder can check whether the LXj item in the merge motion information candidate list overlaps same to items 0 to i−1 of the current motion information candidate list to be filled, and if yes, i remains unchanged and j is added by 1; if not, executing storing the statement in the table, so as to generating a GPM motion information candidate list that does not include the overlapped motion vector finally.

If i has not reached MaxNumGpmMergeCand−1, and j has been increased to MaxNumGpmMergeCand, the motion vector that value is equal to is supplemented subsequently, or the information corresponding to the last motion vector stored before that is repeated. Wherein, MaxNumGpmMergeCand is the length of the GPM motion information candidate list.

Figure 7:
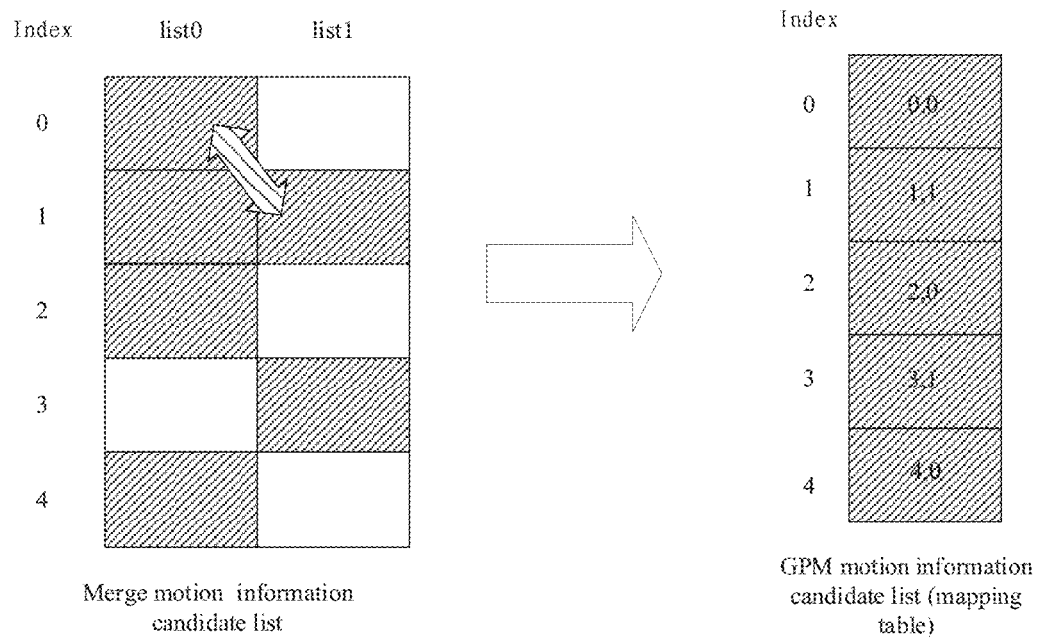
FIG. 7 is a diagram of a first example of the mapping relationship according to an exemplary embodiment.

FIG. 7 shows a process of duplicate checking and de-duplication when constructing with the mapping table way.

S104. Selecting a first motion vector corresponding to a first partition in the current block and a second motion vector corresponding to a second partition in the current block from the GPM motion information candidate list.

In the embodiment of the present disclosure, after the encoder generating the GPM motion information candidate list, the encoder can select the first motion vector corresponding to the first partition in the current block from the GPM motion information candidate list, and the second motion vector corresponding to the second partition in the current block from the GPM motion information candidate list.

It should be noted that, in this embodiment of the present disclosure, the encoder can select the first motion vector and the second motion vector respectively based on the positions of the first partition and the second partition in the current block. Wherein, there is a certain sequence for the encoder to select the first motion vector and the second motion vector.

It should be noted that, in the embodiment of the present disclosure, after the encoder selecting the first motion vector and the second motion vector, the corresponding motion vector can be stored in the processing variable of the corresponding partition to prepare for subsequent inter prediction.

In the embodiment of the present disclosure, the encoder selecting the first motion vector of the first partition in the current block and the second motion vector of the second partition in the current block from the GPM motion information candidate list, comprising: obtaining a motion vector selection sequence for the first partition and the second partition, selecting the first motion vector and the second motion vector according to the motion vector selection sequence from the GPM motion information candidate list.

Specifically, in the embodiment of the present disclosure, the encoder selecting the first motion vector and the second motion vector according to the motion vector selection sequence from the GPM motion information candidate list, comprising: when the motion vector selection sequence indicates the first partition is prior to the second partition, selecting the first motion vector from the GPM motion information candidate list; acquiring, from the GPM motion information candidate list, a motion vector in the more motion candidate information items which belongs to the same motion candidate information items with the first motion vector, and determining it as a non-selectable motion vector; selecting the second motion vector from the motion vectors different from the first motion vector and the non-selectable motion vector in the GPM motion information candidate list.

Specifically, in the embodiment of the present disclosure, the encoder selecting the first motion vector and the second motion vector according to the motion vector selection sequence from the GPM motion information candidate list, comprising: when the motion vector selection sequence indicates the second partition is prior to the first partition, selecting the second motion vector from the GPM motion information candidate list; acquiring, from the GPM motion information candidate list, a motion vector in the more motion candidate information items which belongs to the same motion candidate information items with the second motion vector, and determining it as a non-selectable motion vector; selecting the first motion vector from the motion vectors different from the second motion vector and the non-selectable motion vector in the GPM motion information candidate list.

Exemplarily, in the embodiment of the present disclosure, the encoder selects the first motion vector of the first partition firstly, and the first position information of the first motion vector is m, as shown in equation (1):

$$m = \text{merge\_gpm\_idx0}[xCb][yCb] \quad (1)$$

Specifically, in the embodiment of the present disclosure, the encoder selects the second motion vector of the second partition selected lately, and the second position information of the second motion vector is n, as shown in equation (2):

$$n = \text{merge\_gpm\_idx1}[xCb][yCb] + (\text{merge\_gpm\_idx1}[xCb][yCb] >= m)?2:0 \quad (2)$$

It can be understood that, in the embodiment of the present disclosure, after the encoder selects the first motion vector of the first partition firstly, and when the encoder is selecting the second motion vector of the second partition, the order of the first motion vector selected of the first partition is at the fronter in the GPM motion information candidate list, the second motion vector will be decreased by 2. Wherein m and n are correspond to the indexes 0-9 in Table 2 or 0-6 in Table 3.

Because in the geometric prediction block, each partition will only use the unidirection prediction mode, and each item in the GPM motion information candidate list may be a bidirection prediction motion vector, so the unidirection motion vector is need to be taken out for use. Let $X=(m\&0x01)$, where X is the reference list indication information, which is used to indicate list0 and list 1, and & is the bit AND operation, that is, the last bit of m is taken out.

Let M=mergeGPMCandList[m>>1], take the m>>1 item from the GPM motion information candidate list, and use it for the construction of the first motion vector of the first partition. The corresponding first motion vector is stored in the processing variable of the first partition, and the subsequent prediction block structure is prepared.

mvA[0]=mvLXM[0]

mvA[1]=mvLXM[1]

refIdxA=refIdxLXM predListFlagA=X

Wherein mvA is the first motion vector, refIdxA is the reference picture corresponding to the first motion vector, and predListFlagA indicates which component is selected from the alternatives of the list of the first motion vector currently.

Let N=mergeCandList[n>>1], take the n>>1 item from the merge list for the construction of the second motion vector of the second partition.

mvB[0]=mvLXN[0]

mvB[1]=mvLXN[1]

refIdxB=refIdxLXN predListFlagB=X

Wherein mvB is the second motion vector, refIdxB is the reference frame for the second motion vector, and predListFlagB indicates which component is selected from the alternatives of the list of the second motion vector currently.

It should be noted that, in the embodiment of the present disclosure, after the encoder selecting the first motion vector of the first partition from the GPM motion candidate information list, and before selecting the second motion vector of the second partition, the encoder can also remove two items of list0 and list 1 in the merge motion information candidate list for the first partition (if both exist), and then the table is reranked.

That is, when signalling the bitstream, assuming that the first partition selects the m-th motion vector is selected as the first motion vector for the first partition (corresponding to the M-th item in the merge motion information candidate list) and its target motion vector is available, the n-th motion vector will be selected as the second motion vector for the second partition, there is merge_gpm_idx0[xCb][yCb]=m merge_gpm_idx1[xCb][yCb]=n−(merge_gpm_idx1[xCb][yCb]>=m)?(((predFlagL0M+predFlagL1M)==2)?2:1):0

S105. determining the inter prediction value of the current block by using the first motion vector and the second motion vector.

In the embodiment of the present disclosure, after the encoder obtaining the first motion vector and the second motion vector, the encoder can determine the inter prediction value of the current block by using the first motion vector and the second motion vector.

In this embodiment of the present disclosure, the encoder determining the inter prediction value of the current block by using the first motion vector and the second motion vector, comprising: determining a first prediction value of the first partition by using the first motion vector; determining a second prediction value of the second partition by using the second motion vector; performing weighted fusion processing on the first prediction value and the second prediction value to obtain the inter prediction value of the current block.

In the embodiment of the present disclosure, the encoder can multiply the first prediction value of each sample by the first weight value, and add the product of the second prediction value and the second weight value of each sample, thus the weighted fusion of samples in the current block is completed, and the inter prediction value of the current block is obtained.

It should be noted that the first prediction value and the second prediction value are two prediction values for each sample in the current block, and the first weight value and the second weight value also correspond to two different weight values each sample in the current block.

Specifically, in the embodiment of the present disclosure, the flow for GPM prediction processing of the encoder mainly comprising four steps, in order: calculating the unidirection prediction values of the two partitions in the current block, that is, the first prediction value and the second prediction value; deriving angle and position for division; deriving the weighted prediction sample value predSamples for the three components of L, Cb, and Cr; storing motion vector information for subsequent prediction.

Specifically, in the embodiment of the present disclosure, the encoder derives the reference picture list refPicLN and the sub-pixel prediction sample value predSamplesLN for the three components of L, Cb, and Cr, wherein N is the first partition or the second partition, and the steps are the same as the general inter prediction technology. That is, the unidirection prediction values of the two partitions are calculated respectively by using the existing motion compensation method, which is used in the final weighted fusion process of GPM. The motion compensation here is the same as the conventional motion compensation process, that is, the sample value of the corresponding area is found and copied through the corresponding motion vector. It won't be repeated here.

Specifically, in the embodiment of the present disclosure, when the encoder determining that GPM is used for interframe prediction, the encoder can also derive the angle and position for partition.

In the embodiment of the present disclosure, the encoder determines the partition mode with the least rate-distortion cost by traversing the 82 partition models for the GPM, that is, determines the target partition mode. And then the encoder can determine the angle index information and the step index information for the target partition mode based on the target partition mode by using a mapping table of the preset partition mode, the angle index, and the step index. Wherein, the mapping table of the preset division mode, the angle index, and the step index is shown in Table 4:

TABLE 4

| merge_gpm_partition_idx | 0 | 1 | 2 | 3 | 4 | 5 | 6 | 7 | 8 | 9 | 10 | 11 | 12 | 13 | 14 | 15 |
|---|---|---|---|---|---|---|---|---|---|---|---|---|---|---|---|---|
| angleIdx | 0 | 0 | 2 | 2 | 2 | 2 | 3 | 3 | 3 | 3 | 4 | 4 | 4 | 4 | 5 | 5 |
| distanceIdx | 1 | 3 | 0 | 1 | 2 | 3 | 0 | 1 | 2 | 3 | 0 | 1 | 2 | 3 | 0 | 1 |
| merge_gpm_partition_idx | 16 | 17 | 18 | 19 | 20 | 21 | 22 | 23 | 24 | 25 | 26 | 27 | 28 | 29 | 30 | 31 |
| angleIdx | 5 | 5 | 8 | 8 | 11 | 11 | 11 | 11 | 12 | 12 | 12 | 12 | 13 | 13 | 13 | 13 |
| distanceIdx | 2 | 3 | 1 | 3 | 0 | 1 | 2 | 3 | 0 | 1 | 2 | 3 | 0 | 1 | 2 | 3 |
| merge_gpm_partition_idx | 32 | 33 | 34 | 35 | 36 | 37 | 38 | 39 | 40 | 41 | 42 | 43 | 44 | 45 | 46 | 47 |
| angleIdx | 14 | 14 | 14 | 14 | 16 | 16 | 18 | 18 | 18 | 19 | 19 | 19 | 20 | 20 | 20 | 21 |
| distanceIdx | 0 | 1 | 2 | 3 | 1 | 3 | 1 | 2 | 3 | 1 | 2 | 3 | 1 | 2 | 3 | 1 |
| merge_gpm_partition_idx | 48 | 49 | 50 | 51 | 52 | 53 | 54 | 55 | 56 | 57 | 58 | 59 | 60 | 61 | 62 | 63 |
| angleIdx | 21 | 21 | 24 | 24 | 27 | 27 | 27 | 28 | 28 | 28 | 29 | 29 | 29 | 30 | 30 | 30 |
| distanceIdx | 2 | 3 | 1 | 3 | 1 | 2 | 3 | 1 | 2 | 3 | 1 | 2 | 3 | 1 | 2 | 3 |

Wherein, wedge_partition_idx is the partition mode index, angleIdx is the angle index information, and distanceIdx is the step index information.

Specifically, in the embodiment of the present disclosure, the encoder derives the weighted prediction sample value predSamples for the three components of L, Cb, and Cr, wherein, the calculation of the luma prediction value of the current block and the calculation of the chroma prediction value of the current block is included.

Specifically, in the embodiment of the present disclosure, in the calculation of the luma prediction value of the current block, the encoder can first obtain the weight mask matrix of the current block by cropping the predefined weight matrix, and then perform the calculation sample by sample on the prediction value of the two partitions in the current block, to obtain the luma prediction value of the current block.

Figure 8:
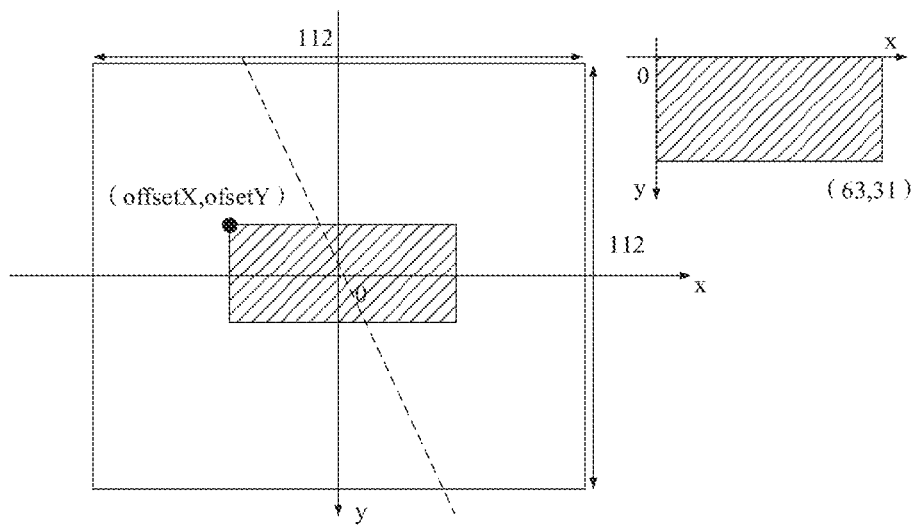
FIG. 8 is a computation diagram of offset value according to an exemplary embodiment.

It should be noted that, in the embodiment of the present disclosure, in the obtaining of the weight matrix the encoder need to calculate the offset value Offset(x, y) of the top left corner of the current block for the origin of coordinates through the current block and the partition mode of the current block, and the coordinate origin is at the geometric center point of the same size block with the same angle partiting line passing through the geometric center point, as shown in FIG. 8.

It should be noted that, in the embodiment of the present disclosure, as shown in FIG. 8, the background area is the maximum moving range (112×112) of the largest size block (64×64) relative to of the coordinate system based on the current limited conditions, through the offset value offset vector. If the partiting line does not pass through the center point of the block, keep the relative position of the partiting line unchanged, and move the position of the block in the coordinate system to obtain an appropriate partition.

It should be noted that, in the embodiment of the present disclosure, the core parameters required for calculation of the offset value are as follows:

Because the distance from the sample (x1, y1) to the line cos αx−sin αy=0 is d=cos αx1−sin αy1, First, you need to get the index number displacementX of α in cos(α) of the current angle, and the index number displacement of $$\alpha + \frac{\pi}{2}$$

in corresponding $$-\sin(\alpha) = \cos\left(\alpha + \frac{\pi}{2}\right).$$

Wherein the index number displacement is the equation (1) and the index number is the equation (2):

$$\text{displacementX}=\text{angleIdx}; \tag{1}$$

$$\text{displacementY}=(\text{displacementX}+8)\%32 \tag{2}$$

Wherein, the step length used when constructing the predefined weight matrix is only the first step length (that is, the partiting line must be intersect with the center point of the block).

It can be understood that, in the embodiment of the present disclosure, the transmission of related information in the bitstream of the first partition and the second partition is sequential. Therefore, certain principles must be followed in the sequence of the two partitions, PaetFlip is calculated by the following equation (3):

$$\text{partFlip}=(\text{angleIdx}>=13\&\&\text{angleIdx}<=27)?0:1 \tag{3}$$

Wherein, partFlip is 0, which means that the partition on the side of the distance weigheIdg between the sample obtained by the subsequent equation (8) and the partiting line is negative needs to be transmitted first; correspondingly, partFlip is 1, which means that the partition on the side of the value weigheIdg is positive needs to be transmitted first.

It should be noted that, in the embodiment of the present disclosure, the encoder can obtain the key parameter shiftHor through the following equation (4) and (5):

$$\text{hwRatio}=\text{nH}/\text{nW} \tag{4}$$

$$\text{shiftHor}=(\text{angleIdx}\%16==8\|\\ (\text{angleIdx}\%16!=0\&\&\text{hwRatio}>0))?0:1 \tag{5}$$

Wherein, nH is the height of the current block, nW is the height of the current block, and the meaning of shiftHor is the determination of the displacement direction between different partiting lines at the same anglex, and if the value is 0, the partiting line will be offset on the Y axis; if the value is 1, the partiting line will be offset on the X axis.

It should be noted that in the embodiment of the present disclosure, after the encoder obtaining the key parameter shiftHor, the encoder calculates the offset values offsetX and offsetY of the current block according to the size and partition information of the current prediction block by using equation (6-7):

If shiftHor==0, the current block has an offset value related to the height of the current block in the vertical direction, and the current offset information is shown in the following equation (6):

$$\text{offsetX}=(-\text{nW})>>1$$

$$\text{offsetY}=((-\text{nH})>>1)+\text{angleIdx}<16?(\text{distanceIdx}*\\ \text{nH})>>3: -((\text{distanceIdx}*\text{nH})>>3) \tag{6}$$

If shiftHor==1, the current block has an offset value related to the width of the current block in the horizontal direction, and the current offset information is shown in the following equation (7):

$$\text{offsetX}=((-\text{nW})>>1)+\text{angleIdx}<16?(\text{distanceIdx}*\\ \text{nW})>>3: -((\text{distanceIdx}*\text{nW})>>3)\;\text{offsetY}=(-\\ \text{nH}>>1 \tag{7}$$

It should be noted that, in the embodiment of the present disclosure, after the encoder determining the offset information offsetX and offsetY, the encoder calculates the weight index weightIdx of the sample according to the position of the sample in the current block, and calculate the weight value of the sample by using equation (8)-(10) to obtain the weight matrix of the current block:

$$\text{weightIdx}=(((x*\text{subW}+\text{offsetX})<<1)+1*)\text{disLut}[\text{dis-}\\ \text{placementX}]+(((y*\text{subH}+\text{offsetY})<<1)+1))*\text{dis-}\\ \text{Lut}[\text{displacementY}]. \tag{8}$$

$$\text{weightIdxL}=\text{partFlip}?32+\text{weightIdx}:32-\text{weightIdx} \tag{9}$$

$$\text{wValue}=\text{Clip3}(0,8,(\text{weightIdxL}+4)>>3) \tag{10}$$

Wherein, clip3 represents the clamp operator, 0 represents the lower hound value, and 8 represents the upper bound value. For example, clip3(i, j, x) represents: when x is less than i, its value is i; when x is greater than j, its value is j; when x is greater than or equal to i and less than or equal to j, its value is x.

In addition. Table 5 provides an example of the search for the distance arrangement of the geometric partition line, disLut[ ] used in equation (8) is shown in Table 3, subW and subH represent the down-sampling rate; if the YUV format of the current block is 420, subW and subH can both be 2, disLut[ ] is shown in Table 5. subW and subH indicate the down-sampling rate, if the YUV format of the current block is 420, subW and subH are both 2. The luma weight does not need to be down-sampled, and the chroma weight is obtained by down-sampling the luma weight.

TABLE 5

| idx | 0 | 2 | 3 | 4 | 5 | 6 | 8 | 10 | 11 | 12 | 13 | 14 |
|---|---|---|---|---|---|---|---|---|---|---|---|---|
| disLut[idx] | 8 | 8 | 8 | 4 | 4 | 2 | 0 | −2 | −4 | −4 | −8 | −8 |
| idx | 16 | 18 | 19 | 20 | 21 | 22 | 24 | 26 | 27 | 28 | 29 | 30 |
| disLut[idx] | −8 | −8 | −8 | −4 | −4 | −2 | 0 | 2 | 4 | 4 | 8 | 8 |

Wherein, the smaller the absolute value of weightIdxL, the closer the sample is to the edge of the partition, and the more even the weight distribution of the sample on the first partition and the second partition.

Specifically, in the embodiment of the present disclosure, the encoder performs sample-by-sample weighting on the prediction values of the two partitions of the current block to obtain the final inter prediction value of the current block, and the specific weighting calculation is shown in equation (11):

$$\text{pbSamples}[x][y]=\text{Clip3}(0,(1<<\text{BitDepth})-1, (\text{pred-}\\ \text{SamplesLA}[x][y]*\text{wValue}+\text{predSamplesLB}\\ [x][y]*(8-\text{wValue})+\text{offset1})>>\text{shift1}) \tag{11}$$

Wherein, the calculation of offset1 and shift1 are shown in equations (12)-(13), offset1 is used for rounding, and shift1 is used to restore the prediction value after weighted average to the same bit depth as the input video.

$$\text{shift1}=\text{Max}(5,17-\text{BitDepth}) \quad (12)$$

$$\text{offset1}=1<<(\text{shift1}-1) \quad (13)$$

In the embodiment of the present disclosure, in the calculation of the chroma prediction value for the current block by the encoder, the encoder can take the luma sample weight of the upper left corner of each 2*2 block as the chroma sample weight of the current sample (x, y) directly, that is, down-sample the luma sample weight, and the weight calculation way of the chroma prediction value is same to calculation of the luma prediction value shown in equation (11). The sampling relationship of the luma weight matrix and chroma weight matrix is shown in FIG. 9A and FIG. 9B.

Specifically, in the embodiment of the present disclosure, the process of the encoder storing the GPM motion vector of the current prediction block is implemented by using a motion mask matrix. If the prediction value is entirely from the first partition, the first motion vector of the first partition is recorded; if the prediction value is entirely from the second partition, and the second motion vector of the second partition is recorded; otherwise, the motion vectors of the two partitions are recorded at the same time. The calculation of the motion mask is basically the same with the process of calculating the luma weight matrix, the offset value offset is calculated firstly, the calculation of the offset is shown in equation (14)-(15):

In the case of shiftHor=0.

$$\text{offsetX}=(-\text{cbWidth})>>1 \text{ offsetY}=((-\text{cbHeight})>>1)+ \\ (\text{angleIdx}<16?(\text{distanceIdx}*\text{cbHeight})>> \\ 3: -((\text{distanceIdx}*\text{cbHeight})>>3)) \quad (14)$$

In the case of shiftHor=1:

$$\text{offsetX}=((-\text{cbWidth})>>1)+(\text{angleIdx}<16? \\ (\text{distanceIdx}*\text{cbWidth})>>3: -((\text{distanceIdx}* \\ \text{cbWidth})>>3)) \text{ offsetY}=(-\text{cbHeight})>>1 \quad (15)$$

Wherein, cbWidth is the width of the motion mask matrix of the current block, and cbHeight is the height of the motion mask matrix of the current block, which is actually the width and height of the luma component of the current block.

It should be noted that in this embodiment of the present disclosure, the motion mask matrix of the current block is still calculated in units of 4×4 sub-blocks, and the calculation if motionIdx at the center position of each 4×4 sub-block is (4i+2, 4j+2) is similar to the calculation of weight-Idx in equation (8), as shown in equation (16):

$$\text{motionIdx}=(((4*\text{xSbIdx}+\text{offsetX})<<1)+5)*\text{disLut} \\ [\text{displacementX}]+(((4*\text{ySbIdx}+\text{offsetY})<<1)+ \\ 5)*\text{disLut}[\text{displacementY}] \quad (16)$$

It is understandable that, in the embodiment of the present disclosure, the encoder determines that the motion vector needs to store by the current 4×4 sub-block is the same as when predicting weighting, and the current sub-block is on the side of the first partition or the second partition need to be determined firstly.

$$\text{partIdx}=(\text{angleIdx}>=13 \&\& \text{angleIdx}<=27)?0:1 \quad (17)$$

Wherein (XSbIdx, ySbIdx) represents the sub-block coordinates of each 4×4 sub-block (sb) in the current, block. The range of coordinates is xSbIdx=0 . . . numSbX-1 and ySbIdx=0 . . . numSbY-1. partIdx represents whether the two partitions need to be flipped.

$$\text{sType}=\text{abs}(\text{motionIdx})<32?2:(\text{motionIdx}<=0?(1- \\ \text{partIdx}):\text{partIdx}) \quad (18)$$

In the embodiment of the present disclosure, the encoder determines whether the current sub-block stores unidirectional or bidirectional motion vectors according to the size of abs (motionIdx) at the center position (4i+2, 4j+2) of each 4×4 sub-block.

Exemplarily, if sType is 2, the current block stores the constructed bidirectional motion vector, that is, the first motion vector and the second motion vector are stored at the same time;

Otherwise,

If sType is 0, the current block stores the first motion vector of the first partition;

If sType is 1, the current block stores the second motion vector of the second partition;

It should be noted that in this embodiment of the present disclosure, the stored motion vector will be used for the motion vector prediction of the subsequent coding block.

It should be noted that, in the embodiment of the present disclosure, after the encoder determining the inter prediction value of the current block by using the first motion vector and the second motion vector, that is, after step S105, the following steps may be performed: obtaining the first position information of the first motion vector and second position information of the second motion vector from the motion information candidate list; signalling the first position information and the second position information into the bitstream.

Specifically, in the embodiment of the present disclosure, the encoder regards GPM and other inter prediction modes as competing modes, selects between modes according to rate-distortion optimization (RDO) or other strategies, and the selected result is signaled into the bitstream in the form of the syntax element which is transmitted to the decoder. The encoder can assign values to the first position information of the first motion vector and the second position information of the second motion vector respectively, and then perform binarization and entropy encoding on them, finally signal them into the bitstream for transmission. Wherein, the encoder performs the assignment of position information according to the following equation (19)-(20):

$$\text{merge\_gpm\_idx0}[xCb][yCb]=m \quad (19)$$

$$\text{merge\_gpm\_idx1}[xCb][yCb]=n-(\text{merge\_gpm\_idx1} \\ [xCb][yCb]>=m)?2:0 \quad (20)$$

Wherein, a is the first position information of the first motion vector in the GPM motion information candidate list, and n is the second position information of the second motion vector in the GPM motion information candidate list.

It can be understood that, in the embodiment of the present disclosure, the second position information of the second motion vector of the second partition in the GPM motion information candidate list may be decreased by 2 because the first motion vector in the front position is selected for the first partition firstly.

It should be noted that, in the embodiment of the present disclosure, the description for the coding unit layer syntax for the current block is shown in Table 6.

TABLE 6

| | Descriptor |
|---|---|
| merge_data(x0, y0, cbWidth, cbHeight, cbType) { | |
| ...... | |
| merge_gpm_partition_idx[x0][y0] | ae(v) |
| merge_gpm_idx0[x0][y0] | ae(v) |
| if( MaxNumGpmMergeCand > 1 ) | |
| merge_gpm_idx1[x0][y0] | ae(v) |
| ......} | |

Here, ae(v) represents context-adaptive arithmetic entropy-coded syntax element. merge_gpm_idx0[x0][y0] represents the first position information of the first motion vector of the first partition in the current block, merge_gpm_idx1[x0][y0] represents the second position information of the second motion vector of the second partition in the current block, MaxNumGpmMergeCand represents the maximum length of the motion information candidate list.

It should be noted that, in the embodiment of the present disclosure, after obtaining a merge motion information candidate list of the current block when the prediction mode parameter indicates using a geometrical partition mode (GPM) to determine an inter prediction value of the current block, further comprising: generating a motion vector included in the merge motion information candidate list to be an indicator information which is available for the first partition and the second partition.

Exemplarily, in the embodiment of the present disclosure, the encoder may add a sentence indicating a direction, as shown in the following Table 7:

TABLE 7

| | |
|---|---|
| merge_gpm_partition_idx[ x0 ][ y0 ] | ae(v) |
| merge_gpm_idx0[ x0 ][ y0 ] | ae(v) |
| merge_gpm_dir0[ x0 ][ y0 ] | ae(v) |
| if( MaxNumGpmMergeCand > 2 ){ | |
| merge_gpm_idx1[ x0 ][ y0 ] | ae(v) |
| merge_gpm_dir1[ x0 ][ y0 ] | ae(v) |
| } | |

In this way, the meanings of merge_gpm_idx0[x0][y0] and merge_gpm_idx1[x0][y0] are the same as the prior art, but the list0 and list1 items in the merge motion information candidate list are both available, so which one to choose list0 or list1 is indicated by merge_gpm_dir0[x0][y0] and merge_gpm_dir1[x0][y0] respectively. The value 0 of merge_gpm_dir0[x0][y0], merge_gpm_dir1[x0][y0] represents the corresponding list0 item, and 1 represents the corresponding list1 item.

In the embodiment of the present disclosure, before the encoder constructs a motion information candidate list to be filed by using the motion vectors included in the motion candidate information items according to a sequence of the motion candidate information items in the merge motion information candidate list, to generate a GPM motion information candidate list, further comprising: obtaining a first length of the merge motion information candidate list and a syntax value of sequence parameter set; calculating twice of the difference between the first length and the syntax value of sequence parameter set, obtaining a second length corresponding to the GPM motion information candidate list.

Exemplarily, in the embodiment of the present disclosure, the length of the GPM motion information candidate list (for example, 2*(6−1)=10) is set to twice of the difference between the length of the merge motion information candidate list (for example, 6) and the syntax value of sequence parameter set max_num_merge_cand_minus_max_num_gmp_cand (for example, 1) is twice the difference.

In the prior art, the meaning of the syntax value of sequence parameter set max_num_merge_cand_minus_max_num_gpm_cand is the same as before, which refers to the number of the motion vectors which is not used for GPM candidate in the bidirection/unidirection motion vectors used for GPM in the merge motion information candidate list. (one item of two directions will be counted). However, in the embodiment of the present disclosure, the grammatical meaning of this item is modified as: in the bidirectional/unidirectional motion vector used for GPM in the merge motion information candidate list, how many (two items of two directions will be counted) are not used for GPM candidate. In this way, the number of available motion vectors can be more, such as 4, 5, 6, 7, 8, 9, 10, 11, 12.

In the embodiment of the present disclosure, before the encoder constructs a motion information candidate list to be filed by using the motion vectors included in the motion candidate information items according to a sequence of the motion candidate information items in the merge motion information candidate list, generates a GPM motion information candidate list, further comprising: obtaining a number of the motion vectors in the merge motion information candidate list which cannot be used to construct the motion information candidate list to be filed, and determining it to be the syntax value of sequence parameter set.

The embodiment of the present disclosure provides an inter prediction method, which is applied to an encoder, which comprising: determining a prediction mode parameter of a current block; obtaining a merge motion information candidate list of the current block when the prediction mode parameter indicates using a geometrical partition mode (GPM) to determine an inter prediction value of the current block; wherein the merge motion information candidate list includes one or more motion candidate information item for determining the inter prediction value of the current block, the motion candidate information item includes one or two motion vector; constructing a motion information candidate list to be filed by using the motion vectors included in the motion candidate information items according to a sequence of the motion candidate information items in the merge motion information candidate list, generating a GPM motion information candidate list, wherein the motion candidate information items in the GPM motion information candidate list comprising one motion vector; selecting a first motion vector of a first partition in the current block and a second motion vector of a second partition in the current block from the GPM motion information candidate list; determining the inter prediction value of the current block by using the first motion vector and the second motion vector. The technical solution provided by the embodiments of the present disclosure takes a motion vector in the merge motion information candidate list as one item, and constructs the GPM motion information candidate list by using the motion vector according to the sequence of the motion vector in the merge motion information candidate list, which improves the reliability of the GPM motion information candidate list, and thus improves the inter prediction performance and coding performance.

The embodiment of the present disclosure provides an inter prediction method, which is applied to a decoder. The function implemented by the method can be implemented by the processor in the decoder by calling program code, of course, the program code can be stored in a computer storage medium; so it can be seen that the video encoding device comprises at least a processor and a storage medium.

Figure 10:
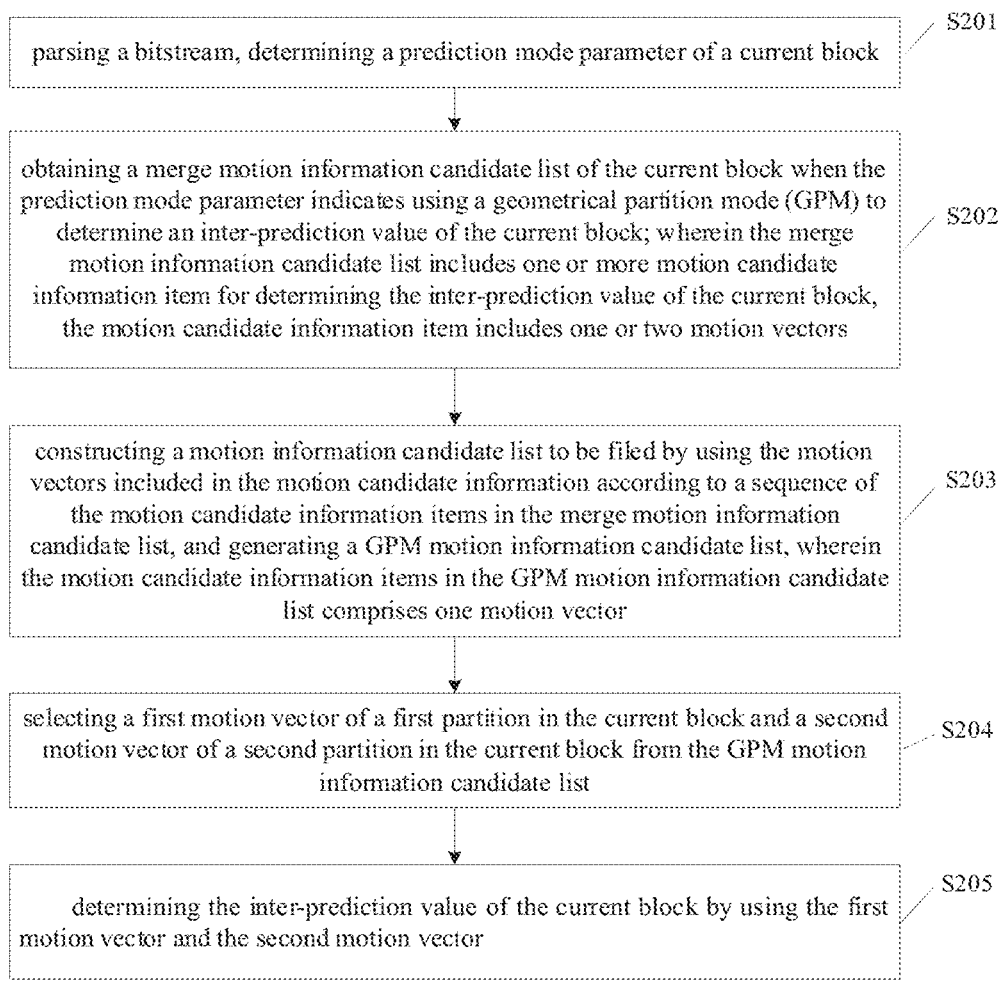
FIG. 10 is a flowchart of an inter prediction method according to another exemplary embodiment.

FIG. 10 is a schematic diagram of the implementation process of an intra-prediction method according to an embodiment of the present disclosure, as shown in FIG. 10, the method comprising:

S201. parsing a bitstream, determining a prediction mode parameter of a current block;

S202. obtaining a merge motion information candidate list of the current block when the prediction mode parameter indicates using a geometrical partition mode (GPM) to determine an inter prediction value of the current block; wherein the merge motion information candidate list includes one or more motion candidate information item for determining the inter prediction value of the current block, the motion candidate information item includes one or two motion vector.

S203. constructing a motion information candidate list to be filed by using the motion vectors included in the motion candidate information items according to a sequence of the motion candidate information items in the merge motion information candidate list, generating a GPM motion information candidate list, wherein the motion candidate information items in the GPM motion information candidate list comprising one motion vector.

S204. selecting a first motion vector corresponding to a first partition in the current block and a second motion vector of a second partition in the current block from the GPM motion information candidate list.

S205. determining the inter prediction value of the current block by using the first motion vector and the second motion vector.

Specifically, in the embodiment of the present disclosure, the decoder obtaining a merge motion information candidate list of the current block, comprising: obtaining one or more reference block of the current block; acquiring a motion vector of the reference block in one or more preset direction to obtain the motion candidate information, arranging the motion candidate according to a preset arrangement manner to obtain the merge motion information candidate list.

Specifically, in the embodiment of the present disclosure, the decoder constricting a motion information candidate list to be filed by using the motion vectors included in the motion candidate information items according to a sequence of the motion candidate information items in the merge motion information candidate list, generating a GPM motion information candidate list comprising: determining whether a target motion vector is available when the target motion vector is used to construct the motion information candidate list to be filled according to a sequence of the target motion vector in the merge motion information candidate list; wherein the target motion vector is any one motion vector in the motion candidate information; in case of the target motion vector is not available, skipping using the target motion vector to construct the motion information candidate list to be filled; using the next motion vector arranged after the target motion vector in the merge motion information candidate list to continue the construction of the motion information candidate list to be filed.

It should be noted that in this embodiment of the present disclosure, the decoder constructing the GPM motion information candidate list by skipping motion vectors that are not available in the merge motion information candidate list, if the constructed GPM motion information candidate list includes the mapping table of motion vector position information, the specific implementation way is as follows:

For i=0~MaxNumGpmMergeCand-1, j=0~MaxNumMergeCand-1, the following operations are performed:

Let X=0, checking whether LXm of the merge list is available, and if available, storing the corresponding motion vector into mergeGPMCandMapListi, mergeGPMCandMapList[i][0]=j mergeGPMCandMapList[i][1]=X i=i+1

If i<MaxNumGpmMergeCand-1, then let X=1, checking whether LXm of the merge list is available, and if available, storing the corresponding motion vector into mergeGPMCandMapListi.

mergeGPMCandMapList[i][0]=j mergeGPMCandMapList[i][1]=X i=i+1, j=j+1.

Figure 11:
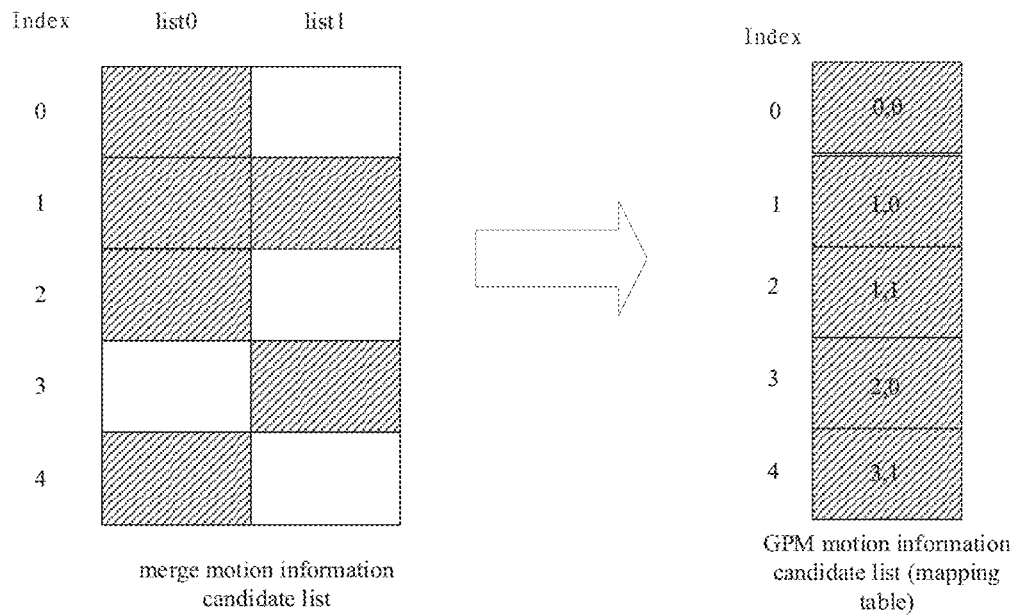
FIG. 11 is a diagram of a second example of a mapping relationship according to an exemplary embodiment.

It should be noted that in the embodiment of the present disclosure, mergeCandList represents a merge motion information candidate list, and mergeGPMCandMapList represents a GPM motion information candidate list (the mapping table). An example of the foregoing process is shown in FIG. 11.

It can be understood that, in this embodiment of the present disclosure, the decoder constructing the GPM motion information candidate list by skipping the motion vectors that are not available in the merge motion information candidate list, that is, if a certain motion vector is unavailable or does not exist, then continuing to take the available motion vectors sequentially until the length of the motion information candidate list to be filled reaches the preset length, and then determining it as the GPM motion information candidate list.

Correspondingly, for the way that the encoder skipping the unavailable motion vectors to generate the GPM motion information candidate list, the way of performing step S104 is specifically as follows:

merge_gmp_idx0[x0][y0], represents the position of the first motion vector of the first partition in the GPM motion information candidate list, let m=merge_gpm_idx0[xCb][yCb], and waiting for subsequent processing.

merge_gpm_idx1[x0][y0], represents the position of the second motion vector of the second partition in the GPM motion information candidate list, the position of the second motion vector of the second partition in the GPM motion information candidate list may be reduced by 1 because the front position is selected by A first. Let n=merge_gpm_idx1[xCb][yCb]+(merge_gpm_idx1 [xCb][yCb]>=m)?1:0, n represents the actual position of the second motion vector selected by the second partition in the GPM motion information candidate list, waiting for subsequent processing.

As shown in the example shown in FIG. 11, the motion vector of list0 with index 0 is added, the motion vector of list0 at position 1 is added to index 1, the motion vector corresponding to list1 at position 1 is added to index 2, and so on. m and n correspond to the black index in the figure, and the mapping is the white two-triple information.

Let M=mergeCandList [mergeGPMCandMapList [m][0]], X=mergeGPMCandMapList [m][1], take the m-th item from the GPM motion information candidate list for the construction of the first motion vector construction of the first partition. The corresponding first motion vector is stored in the processing variable of the first partition, and the subsequent prediction block structure is prepared.

mvA[0]=mvLXM[0]

mvA[1]=mvLXM[1]

refIdxA=refIdxLXM predListFlagA=$X$

Wherein, my A is the my vector, refIdxA is the reference picture for the motion vector, and predListFlagA represents which component of the list of the motion vector alternatives is currently selected.

Let N=mergeCandList[mergeGPMCandMapList [n][0]], X=mergeGPMCandMapList [n][1], and take the n-th item from the merge list for the construction of the second motion vector for the second partition.

mvB[0]=mvLXN[0]

mvB[1]=mvLX[1]

refIdxB=refIdxLXN predListFlagB=$X$

Wherein mvB is the my vector, refIdxB is the reference picture for the motion vector, and predListFlagB represents which component of the list of the motion vector alternatives is currently selected.

The above list can also be consisted of one item:

mergeGPMCandMapList[$i$]=$j$<<1+$X$

When extracting data from the above list in the third step, is can be proceeded as follows:
Let M=mergeCandList[mergeGPMCandMapList [m]]>>1], X=mergeGPMCandMapList [m]&0x01, . . . .
Let N=mergeCandList[mergeGPMCandMapList [n]>>1], X=mergeGPMCandMapList[n]&0x01, . . . .
Wherein, & is bit AND operation, and &0x01 means to take out the last bit.

It should be noted that in the embodiment of the present disclosure, the decoder constructing the GPM motion information candidate list by skipping the motion vectors that are not available in the merge motion information candidate list, if the constructed GPM motion information candidate list includes the list of motion vectors directly, the specific implementation is as follows:

Perform the following operations on i=0-MaxNumGpmMergeCand-1, j=0~MaxNumMergeCand-1:
Let X=0, checking whether LXm in the merge list is available or not, and if available, storing the corresponding motion vector information into mergeGPMCandMapListi.
Let M=mergeCandList[i]

gpmMergeCandList[$i$]·mv[0]=mvLXM[0]

gpmMergeCandList[$i$]·mv[1]=mvLXM[1]

gpmMergeCandList[$i$]·refIdx=refIdxLXM gpmMergeCandList[$i$]·predListFlag=$X$ $i$=$i$+1.

If i<MaxNumGpmMergeCand-1, and X=1, checking whether LXm in the merge list is available or not, if available, storing the corresponding motion vector information into mergeGPMCandMapListi.
Let M=mergeCandList[i]

gpmMergeCandList[$i$]·mv[0]=mvLXM[0]

gpmMergeCandList[$i$]·mv[1]=mvLXM[1]

gpmMergeCandList[$i$]·refIdx=refIdxLXM gpmMergeCandList[$i$]·predListFlag=$X$ $i$=$i$+1, $j$=$j$+1.

It should be noted that in this embodiment of the present disclosure, gpmMergeCandList is a GPM motion information candidate list (a list of specific motion vectors).

Figure 12:
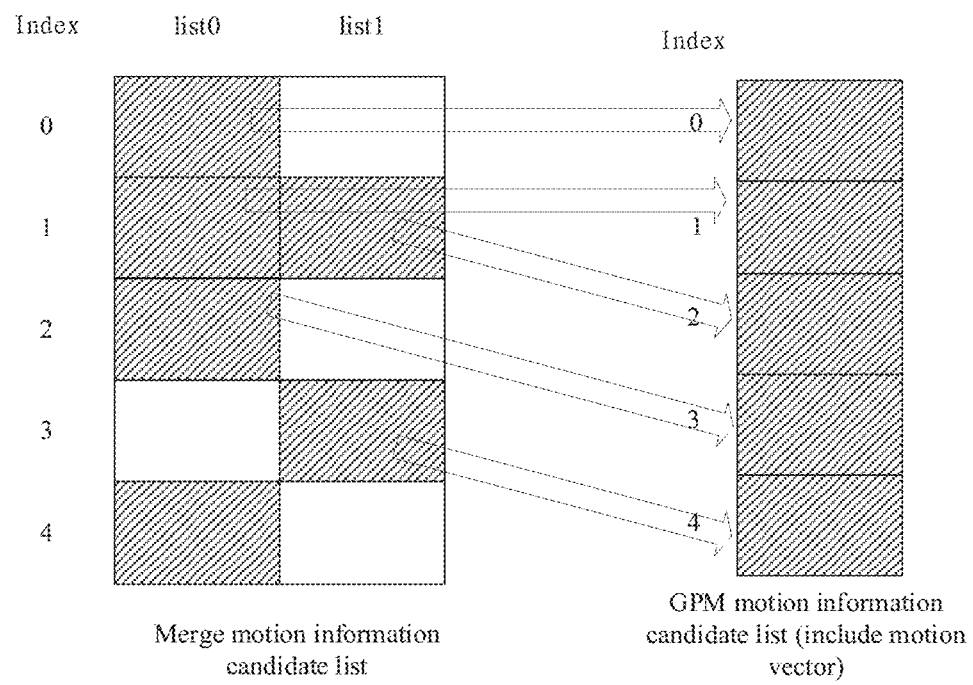
FIG. 12 is a diagram of a third example of a mapping relationship according to an exemplary embodiment.

An example of this process is shown in FIG. 12.

merge_gpm_idx0[x0][y0], represents the position of the first motion vector of the first partition in the GPM motion information candidate list, let
m=merge_gpm_idx0[xCb][yCb], waiting for subsequent processing.
merge_gpm_idx1[x0][y0], represents the position of the second motion vector of the second partition in the GPM motion information candidate list. The position of the second motion vector of the second partition in the GPM motion information candidate list may be reduced by 1 because the front position is selected by the first partition.

Let n=merge_gpm_idx1[xCb][yCb]+(merge_gpm_idx1[xCb][yCb]>=m)?1:0, n represents the actual position of the second motion vector selected by the second partition in the GPM merge candidate list, waiting for subsequent processing.

As shown in the embodiment shown in FIG. 12, the motion vector of list0 is added to index 0, the motion vector of list0 at position 1 is added to index 1, the motion vector corresponding to list1 at position 1 is added to index 2, and so on. m and n correspond to the black indexes on the right side of the figure.

Let X=gpmMergeCandList[m]·predListFlag, fetch the m-th item from the GPM motion information candidate list for the construction of the first motion vector of the first partition. The corresponding first motion vector information is stored in the processing variable of the first partition, and the subsequent prediction block structure is prepared.

mvA[0]=gpmMergeCandList[$m$]·mv[0]

mvA[1]=gpmMergeCandList[$m$]·mv[1]

refIdxA=gpmMergeCandList[$m$]·refIdx predListFlagA=$X$

Wherein, mvA is the my vector, refIdxA is the reference picture of the motion vector, and predListFlagA represents which component of the list of the motion vector alternatives is currently selected.

Let X=gpmMergeCandList[n], fetch the n-th item from the merge list for the construction for the second motion vector of the second partition.

mvB[0]=gpmMergeCandList[$n$]·mv[0]

mvB[1]=gpmMergeCandList[$n$]·mv[1]

refIdxB=gpmMergeCandList[$n$]·refIdx predListFlagB=$X$

Wherein mvB is the mv vector, refIdxB is the reference picture of the motion vector, and predListFlagB indicates which component of the list of the motion vector alternatives is currently selected.

It should be noted that if a GPM motion information candidate list (a mapping table or a list that directly includes motion vectors) is not constructed here, it is need that the m-th available motion vector is counted from the merge motion information candidate list in each item in the order of list0 and then list 1 according to the index from small to large after the m-th and n-th are fetched, and then it is stored into the motion information of the first partition, then the n-th available motion vector is counted from the merge motion information candidate list in each item in the order of list0 and then list 1 according to the index from small to large, and then it is stored into the motion information of the second partition.

It should be noted that the above process is descripted from the perspective of the decoding end. At the encoding end, the performance comparison is performed through a combination of various syntax choices, and finally a set of appropriate parameters (GPM mode, GPM candidate indexes m and n selected respectively by the two partitions) are selected and written into the bitstream. Wherein when the second partition selecting the motion vector after one certain motion vector is selected by the first partition, the index is the list index that removing the first motion vector selected by the first partition.

That is, when signalling the bitstream, it is assumed that the first partition selects the m-th motion vector, and the second partition selects the n-th motion vector:

merge_gpm_idx0[xCb][yCb]=$m$ merge_gpm_idx1[xCb][yCb]=$n$−merge_gpm_idx1 [xCb][yCb]>=$m$)?1:0

Specifically, in the embodiment of the present disclosure, the decoder uses the motion vectors included in the motion candidate information items to construct the motion information candidate list to be filled according to the sequence of the motion candidate information items in the fusion motion information candidate list, and generates GPM motion information candidates list comprising: when the number of motion vector items included in the motion information candidate list to be filled reaches the preset number of items, it is determined that the motion information candidate list to be filled is the GPM motion information candidate list.

It should be noted that, in the embodiment of the present disclosure, the prediction mode parameters of the current block that the decoder parses from the bitstream comprise the first position information of the first motion vector, and the second position information of the second motion vector. The decoder can find the first motion vector from the GPM motion information candidate list according to the first position information, and find the second motion vector from the GPM motion information candidate list according to the second position information.

Specifically, in the embodiment of the present disclosure, the decoder determining the inter prediction value of the current block by using the first motion vector and the second motion vector comprising: determining the first prediction value of the first partition by using the first motion vector; determining the second prediction value of the second partition by using the second motion vector; performing GPM inter prediction on the current, block to obtain the inter prediction value of the current block by using the first prediction value and the second prediction value.

Specifically, in the embodiment of the present disclosure, after the decoder obtaining a merge motion information candidate list of the current block when the prediction mode parameter indicates using a geometrical partition mode (GPM) to determine an inter prediction value of the current block, further comprising: generating a motion vector included in the merge motion information candidate list to be an indicator information which is available for the first partition and the second partition.

Specifically, in the embodiment of the present disclosure, before the decoder constructing a motion information candidate list to be filed by using the motion vectors included in the motion candidate information items according to a sequence of the motion candidate information items in the merge motion information candidate list, to generate a GPM motion information candidate list, further comprising: obtaining a first length of the merge motion information candidate list and a syntax value of sequence parameter set; calculating twice of the difference between the first length and the syntax value of sequence parameter set, and obtaining a second length corresponding to the GPM motion information candidate list.

Specifically, in the embodiment of the present disclosure, before constructing a motion information candidate list to be filed by using the motion vectors included in the motion candidate information items according to a sequence of the motion candidate information items in the merge motion information candidate list, and generating a GPM motion information candidate list, further comprising: obtaining a number of the motion vectors in the merge motion information candidate list which cannot be used to construct the motion information candidate list to be filed, and determining it to be the syntax value of sequence parameter set.

It should be noted that, in the embodiment of the present disclosure, the process of constructing the motion information candidate list and inter prediction by the decoder and the encoder is similar, which will not be repeated here.

The embodiment of the present disclosure provides an inter prediction method, which is applied to a decoder, which comprising: parsing a bitstream, determining a prediction mode parameter of a current block; obtaining a merge motion information candidate list of the current block when the prediction mode parameter indicates using a geometrical partition mode (GPM) to determine an inter prediction value of the current block; wherein the merge motion information candidate list includes one or more motion candidate information item for determining the inter prediction value of the current block, the motion candidate information item includes one or two motion vector; constructing a motion information candidate list to be filed by using the motion vectors included in the motion candidate information items according to a sequence of the motion candidate information items in the merge motion information candidate list, generating a GPM motion information candidate list, wherein the motion candidate information items in the GPM motion information candidate list comprising one motion vector; selecting a first motion vector corresponding to a first partition in the current block and a second motion vector of a second partition in the current block from the GPM motion information candidate list; determining the inter prediction value of the current block by using the first motion vector and the second motion vector. The technical solution provided by the embodiments of the present disclosure takes a motion vector in the merge motion information candidate list as one item, and constructs the GPM motion information candidate list by using the motion vector according to the sequence of the motion vector in the merge motion information candidate list, which improves the reliability of the GPM motion information candidate list, and thus improves the inter prediction performance and coding performance.

Figure 13:
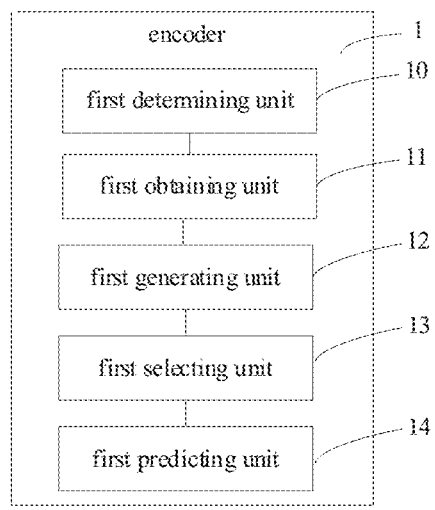
FIG. 13 is a structure diagram of a first example of an encoder according to an exemplary embodiment.

As shown in FIG. 13, an embodiment of the present disclosure provides an encoder 1, comprising:

a first determining unit 10, configured to determine a prediction mode parameter of a current block;

a first obtaining unit 11, configured to obtain a merge motion information candidate list of the current block when the prediction mode parameter indicates using a geometrical partition mode (GPM) to determine an inter prediction value of the current block; wherein the merge motion information candidate list includes one or more motion candidate information item for determining the inter prediction value a the current block, the motion candidate information item includes one or two motion vector;

a first generating unit 12, configured to construct a motion information candidate list to be filed by using the motion vectors included in the motion candidate information items according to a sequence of the motion candidate information items in the merge motion information candidate list, and generate a GPM motion information candidate list, wherein the motion candidate information items in the GPM motion information candidate list comprising one motion vector;

a first selecting unit 13, configured to select a first motion vector of a first partition in the current block and a second motion vector of a second partition in the current block from the GPM motion information candidate list;

a first predicting unit 14, configured to determine the inter prediction value of the current block by using the first motion vector and the second motion vector.

In some embodiments of the present disclosure, the first obtaining unit 11 is configured to obtain one or more reference block of the current block; acquire a motion vector of the reference block in one or more preset direction to obtain the motion candidate information; arrange the motion candidate according to a preset arrangement manner to obtain the merge motion information candidate list.

In some embodiments of the present disclosure, the first generating unit 12 is configured to determine whether a target motion vector is available when the target motion vector is used to construct the motion information candidate list to be filled according to a sequence of the target motion vector in the merge motion information candidate list; wherein the target motion vector is any one motion vector in the motion candidate information; in case of the target motion vector is not available, skip using the target motion vector to construct the motion information candidate list to be filled; use the next motion vector arranged after the target motion vector in the merge motion information candidate list to continue the construction of the motion information candidate list to be filed.

In some embodiments of the present disclosure, the first generating unit 12 is configured to determine the motion information candidate list to be filed to be the GPM motion information candidate list when a number of the motion vector in the motion information candidate list to be filed reaches a preset number.

In some embodiments of the present disclosure, the first selecting unit 13 is configured to obtain a motion vector selection sequence of the first partition and the second partition; select the first motion vector and the second motion vector from the GPM motion information candidate list according to motion vector selection sequence.

In some embodiments of the present disclosure, the first selecting unit 13 is configured to select the first motion vector from the GPM motion information candidate list when the motion vector selection sequence indicates the first partition is prior to the second partition; acquire, from the GPM motion information candidate list, a motion vector in the more motion candidate information items which belongs to the same motion candidate information items with the first motion vector, and determine it as a non-selectable motion vector; select the second motion vector from the motion vectors different from the first motion vector and the non-selectable motion vector in the GPM motion information candidate list.

In some embodiments of the present disclosure, the first selecting unit 13 is configured to select the second motion vector from the GPM motion information candidate list when the motion vector selection sequence indicates the second partition is prior to the first partition; acquire, from the GPM motion information candidate list, a motion vector in the more motion candidate information items which belongs to the same motion candidate information item with the second motion vector, and determine it as a non-selectable motion vector; select the first motion vector from the motion vectors different from the second motion vector and the non-selectable motion vector in the GPM motion information candidate list.

In some embodiments of the present disclosure, the first predicting unit 14 is configured to determine a first prediction value of the first partition by using the first motion vector, determine a second prediction value of the second partition by using the second motion vector; perform. GPM inter prediction on the current block by using the first prediction value and the second prediction value, to obtain the inter prediction value of the current block.

In some embodiments of the present disclosure, the encoder 1 also comprises a signalling unit 15 (not shown in the figure).

the first obtaining, unit 11 is configured to obtain a first position information signaling the first motion vector and a second position information signaling the second motion vector from the GPM motion information candidate list;

the signalling unit 15 is configured to signal the first position information and the second position information into a bitstream.

In some embodiments of the present disclosure, the first generating unit 12 is configured to generate a motion vector included in the merge motion information candidate list to be an indicator information which is available for the first partition and the second partition.

In some embodiments of the present disclosure, the first determining unit 10 is configured to obtain a first length signaling the merge motion information candidate list and a syntax value of sequence parameter set, calculate twice of the difference between the first length and the syntax value of sequence parameter set, to obtain a second length signaling the GPM motion information candidate list.

In some embodiments of the present disclosure, the first determining unit 10 is configured to obtain a number of the motion vectors in the merge motion information candidate list which cannot be used to construct the motion information candidate list to be filed, and determine it to be the syntax value of sequence parameter set.

Figure 14:
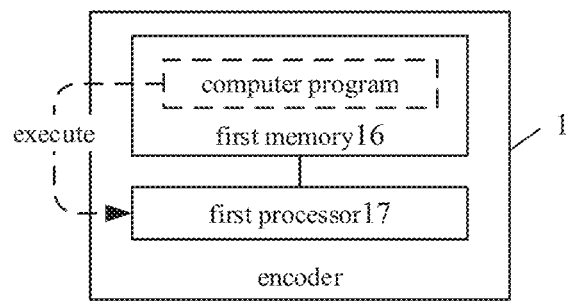
FIG. 14 is a structure diagram of a second example of an encoder according to an exemplary embodiment.

In practical applications, as shown in FIG. 14, an embodiment of the present disclosure also provides an encoder 1, comprising:

A first memory 16 and a first processor 17;

The first memory 16 stores a computer program that can be run on the first processor 17, and the inter prediction method on the encoder end is implemented when the first processor 17 executes the computer program.

The embodiment of the present disclosure provides an encoder which determining a prediction mode parameter of a current block; obtaining a merge motion information candidate list of the current block when the prediction mode parameter indicates using a geometrical partition mode (GPM) to determine an inter prediction value of the current block; wherein the merge motion information candidate list includes one or more motion candidate information item for determining the inter prediction value of the current block, the motion candidate information item includes one or two motion vector; constructing a motion information candidate list to be filed by using the motion vectors included in the motion candidate information items according to a sequence of the motion candidate information items in the merge motion information candidate list, and generate a GPM motion information candidate list, wherein the motion candidate information items in the GPM motion information candidate list comprising one motion vector: selecting a first motion vector signaling a first partition in the current block and a second motion vector signaling a second partition in the current block from the GPM motion information candidate list; determining the inter prediction value of the current block by using the first motion vector and the second motion vector. The encoder provided by the embodiment of the present disclosure takes a motion vector in the merge motion information candidate list as one item, and constructs the GPM motion information candidate list by using the motion vector according to the sequence of the motion vector in the merge motion information candidate list, which improves the reliability of the GPM motion information candidate list, and thus improves the inter prediction performance and coding performance.

Figure 15:
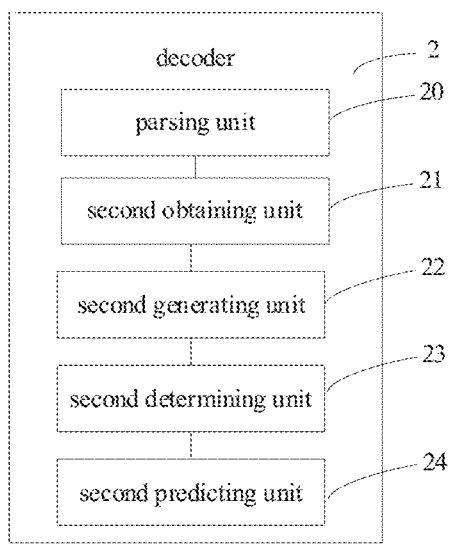
FIG. 15 is a structure diagram of a first example of a decoder according to an exemplary embodiment.

As shown in FIG. 15, an embodiment of the present disclosure provides a decoder 2, comprising:

a parsing unit 20, configured to parse a bitstream, determine a prediction mode parameter of a current block;

a second obtaining unit 21, configured to obtain a merge motion information candidate list of the current block when the prediction mode parameter indicates using a geometrical partition mode (GPM) to determine an inter prediction value of the current block; wherein the merge motion information candidate list includes one or more motion candidate information item for determining the inter prediction value of the current block, the motion candidate information item includes one or two motion vector;

a second generating unit 22, configured to construct a motion information candidate list to be filed by using the motion vectors included in the motion candidate information items according to a sequence of the motion candidate information items in the merge motion information candidate list, and generate a GPM motion information candidate list, wherein the motion candidate information items in the GPM motion information candidate list comprising one motion vector;

a second determining unit 23, configured to select a first motion vector signaling a first partition in the current block and a second motion vector signaling a second partition in the current block from the GPM motion information candidate list;

a second predicting unit 24, configured to determine the inter prediction value of the current block by using the first motion vector and the second motion vector.

In some embodiments of the present disclosure, the second obtaining unit is configured to obtain one or more reference block of the current block; acquire a motion vector of the reference block in one or more preset direction to obtain the motion candidate information; arrange the motion candidate according to a preset arrangement manner to obtain the mere motion information candidate list.

In some embodiments of the present disclosure, the second generating unit 22 is configured to determine whether a target motion vector is available when the target motion vector is used to construct the motion information candidate list to be filled according to a sequence of the target motion vector in the merge motion information candidate list; wherein the target motion vector is any one motion vector in the motion candidate information; in case of the target motion vector is not available, skip using the target motion vector to construct the motion information candidate list to be filled; use the next motion vector arranged after the target motion vector in the merge motion information candidate list to continue the construction of the motion information candidate list to be filed.

In some embodiments of the present disclosure, the second generating unit 22 is configured to determine the motion information candidate list to be filed to be the GPM motion information candidate list when a number of the motion vector in the motion information candidate list to be filed reaches a preset number.

In some embodiments of the present disclosure, the second determining unit 23 is configured to determine a first prediction value signaling the first partition by using the first motion vector; determine a second prediction value signaling the second partition by using the second motion vector; perform GPM inter prediction on the current block by using the first prediction value and the second prediction value, to obtain the inter prediction value of the current block.

In some embodiments of the present disclosure, the second generating unit 22 is configured to generate a motion vector included in the merge motion information candidate list to be an indicator information which is available for the first partition and the second partition.

In some embodiments of the present disclosure, the second determining unit 23 is configured to obtain a first length signaling the merge motion information candidate list and a syntax value of sequence parameter set; calculate twice of the difference between the first length and the syntax value of sequence parameter set, to obtain a second length signaling the GPM motion information candidate list.

In some embodiments of the present disclosure, the second determining unit 23 is configured to obtain a number of the motion vectors in the merge motion information candidate list which cannot be used to construct the motion information candidate list to be filed, and determining it to be the syntax value of sequence parameter set.

Figure 16:
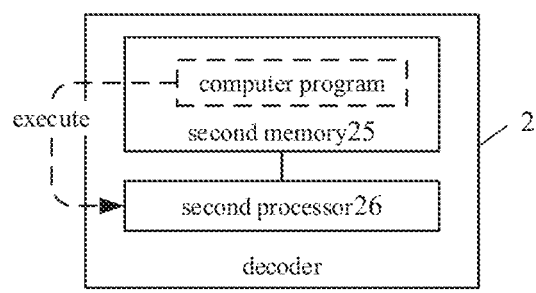
FIG. 16 is a structure diagram of a second example of a decoder according to an exemplary embodiment.

In practical applications, as shown in FIG. 16, an embodiment of the present disclosure also provides a decoder 2, comprising:

a second memory 25 and a second processor 26;

The second memory 25 stores a computer program that can be Mil on the second processor 26, and the decoder side inter prediction method is implemented when the second processor 26 executes the computer program.

The embodiment of the present disclosure provides a decoder, parsing a bitstream, determining a prediction mode parameter of a current block, obtaining a merge motion information candidate list of the current block when the prediction mode parameter indicates using a geometrical partition mode (GPM) to determine an inter prediction value of the current block; wherein the merge motion information candidate list includes one or more motion candidate information item for determining the inter prediction value of the current block, the motion candidate information item includes one or two motion vector; constructing a motion information candidate list to be filed by using the motion vectors included in the motion candidate information items according to a sequence of the motion candidate information items in the merge motion information candidate list, and generating a GPM motion information candidate list, wherein the motion candidate information items in the GPM motion information candidate list comprising one motion vector; selecting a first motion vector corresponding to a first partition in the current block and a second motion vector corresponding to a second partition in the current block from the GPM motion information candidate list; determining the inter prediction value of the current block by using the first motion vector and the second motion vector. The decoder provided by the embodiment of the present disclosure takes a motion vector in the merge motion information candidate list as one item, and constructs the GPM motion information candidate list by using the motion vector according to the sequence of the motion vector in the merge motion information candidate list, which improves the reliability of the GPM motion information candidate list, and thus improves the inter prediction performance and coding performance.

Correspondingly, an embodiment of the present disclosure provides a storage medium on which a computer program is stored, and when the computer program is executed by the first processor, the inter prediction method of the encoder is implemented; or, the computer program is processed by the second processor the inter prediction method of the decoder is implemented.

It should be pointed out that the description of embodiments for the foregoing storage medium and device is similar to the description of the foregoing method embodiments, which have similar beneficial effects as the method embodiment. For technical details not disclosed in the storage medium and device embodiments of the present disclosure, please refer to the description of the method embodiments of the present disclosure for understanding.

The above are only the implementation manners of the present disclosure, but the protection scope of the present disclosure is not limited to it, and any changes or substitutions which can be easily thought within the technical scope disclosed in the present disclosure by any person skilled in the art should be covered in the scope of protection of the present disclosure. Therefore, the protection scope of the present disclosure should be subject to the protection scope of the claims.

INDUSTRIAL APPLICABILITY

In the embodiment of the present disclosure, in the process of inter prediction, a motion vector in the merge motion information candidate list is taken as one item, and the motion vectors are used to construct the GPM motion information candidate list according to the sequence in the merge motion information candidate list, which improves the reliability of the GPM motion information candidate list, thereby improves the inter prediction performance and coding performance.

What is claimed is:

1. An inter prediction method for an encoder, the method comprising:
   determining a prediction mode parameter of a current block;
   obtaining a merge motion information candidate list of the current block when the prediction mode parameter indicates using a geometrical partition mode (GPM) to determine an inter prediction value of the current block, wherein the merge motion information candidate list includes one or more motion candidate information item for determining the inter prediction value of the current block, and wherein the motion candidate information item includes one or two motion vector;
   generating a GPM motion information candidate list by using the motion vectors included in the motion candidate information items and according to a sequence of the motion candidate information items in the merge motion information candidate list, wherein a motion candidate information item in the GPM motion information candidate list includes a motion vector;
   selecting, from the GPM motion information candidate list, a first motion vector for a first partition in the current block and a second motion vector for a second partition in the current block; and
   determining the inter prediction value of the current block by using the first motion vector and the second motion vector.

2. The method according to claim 1, wherein obtaining a merge motion information candidate list of the current block comprises:
   obtaining at least one reference block of the current block;
   acquiring a motion vector of the reference block in one or more preset direction to obtain the motion candidate information;
   arranging the motion candidate information items according to a preset arrangement manner; and
   obtaining the merge motion information candidate list according to the arranged motion candidate information items.

3. The method according to claim 1, wherein generating a GPM motion information candidate list comprises:
   determining whether a target motion vector is available when the target motion vector is used to generate the GPM motion information candidate list, wherein the target motion vector is any one motion vector included in the motion candidate information items:
   in case of the target motion vector is not available, skipping using the target motion vector to generate the GPM motion information candidate list; and
   using a next motion vector arranged after the target motion vector in the merge motion information candidate list to continue the generation of the GPM motion information candidate list.

4. The method according to claim 1, wherein generating a GPM motion information candidate list comprises:
   constructing a motion information candidate list to ne filed by using the motion vectors included in the motion candidate information according to a sequence of the motion candidate information items in the merge motion information candidate list; and
   determining the motion information candidate list to be filed as the GPM motion information candidate list when a number of the motion vectors included in the motion information candidate list to be filed reaches a preset number.

5. The method according to claim 1, wherein the selecting a first motion vector and a second motion vector comprises:
obtaining a motion vector selection sequence for the first partition and the second partition; and
selecting, from the GPM motion information candidate list, the first motion vector and the second motion vector according to the motion vector selection sequence.

6. The method according to claim 5, wherein selecting the first motion vector and the second motion vector comprises:
in case of the motion vector selection sequence indicates the first partition is prior to the second partition, selecting the first motion vector from the GPM motion information candidate list;
acquiring, from the GPM motion information candidate list, a motion vector included in the motion candidate information which belongs to the same motion candidate information as the first motion vector;
determining the motion vector that is acquired as a non-selectable motion vector;
selecting the second motion vector from the motion vectors different from the first motion vector and the non-selectable motion vector in the GPM motion information candidate list;
in case of the motion vector selection sequence indicates the second partition is prior to the first partition selecting the second motion vector from the GPM motion information candidate list;
acquiring, from the GPM motion information candidate list, a motion vector in the motion candidate information which belongs to the same motion candidate information as the second motion vector;
determining the motion vector that is acquired as a non-selectable motion vector; and
selecting the first motion vector from the motion vectors different from the second motion vector and the non-selectable motion vector in the GPM motion information candidate list.

7. The method according to claim 1, wherein determining the inter prediction value of the current block comprises:
determining a first prediction value of the first partition by using the first motion vector;
determining a second prediction value of the second partition by using the second motion vector;
performing GPM inter prediction on the current block by using the first prediction value and the second prediction value, and
obtaining the inter prediction value of the current block.

8. The method according to claim 1, further comprising:
after determining the inter prediction value of the current block: obtaining, from the GPM motion information candidate list, a first position information item of the first motion vector and a second position information item of the second motion vector; and
signaling the first position information item and the second position information item into a bitstream.

9. The method according to claim 1, further comprising:
after obtaining the merge motion information candidate list of the current block:
generating an indicator information item indicating that a motion vector included in the merge motion information candidate list is available for the first partition and the second partition.

10. The method according to claim 1, further comprising:
before generating a GPM motion information candidate list:
obtaining a first length of the merge motion information candidate list and a syntax value of sequence parameter set; and
determining a value that is twice the difference between the first length and the syntax value of sequence parameter set, and determining the determined value as a second length of the GPM motion information candidate list.

11. The method according to claim 1, further comprising:
before generating a GPM motion information candidate list:
obtaining a number of the motion vectors included in the merge motion information candidate list which cannot be used to generate a GPM motion information candidate list; and
determining the obtained number as a syntax value of sequence parameter set.

12. An inter prediction method applicable to a decoder, the method comprising:
determining, from a bitstream, a prediction mode parameter of a current block;
obtaining a merge motion information candidate list of the current block when the prediction mode parameter indicates using a geometrical partition mode (GPM) to determine an inter prediction value of the current block, wherein the merge motion information candidate list includes one or more motion candidate information item for determining the inter prediction value of the current block, and wherein the motion candidate information item includes one or two motion vector;
generating a GPM motion information candidate list, by using the motion vectors included in the motion candidate information items according to a sequence of the motion candidate information items in the merge motion information candidate list, wherein a motion candidate information item in the GPM motion information candidate list includes a motion vector;
selecting, from the GPM motion information candidate list, a first motion vector for a first partition in the current block and a second motion vector for a second partition in the current block; and
determining the inter prediction value of the current block by using the first motion vector and the second motion vector.

13. The method according to claim 12, wherein obtaining a merge motion information candidate list of the current block comprises:
obtaining at least one reference block of the current block;
acquiring a motion vector of the reference block in one or more preset direction to obtain the motion candidate information;
arranging the motion candidate information items according to a preset arrangement manner, and
obtaining the merge motion information candidate list according to the arranged motion candidate information items.

14. The method according to claim 12, wherein generating a GPM motion information candidate list comprises:
determining whether a target motion vector is available when the target motion vector is used to generate a GPM motion information candidate list; wherein the target motion vector is any one motion vector included in the motion candidate information items;

in case of the target motion vector is not available, skipping using the target motion vector to generate a GPM motion information candidate list; and using a next motion vector arranged after the target motion vector in the merge motion information candidate list to continue the generation of the GPM motion information candidate list.

15. The method according to claim 12, wherein generating a GPM motion information candidate list comprises:

constructing a motion information candidate list to be filed by using the motion vectors included in the motion candidate information according to a sequence of the motion candidate information items in the merge motion information candidate list; and determining the motion information candidate list to be filed as the GPM motion information candidate list when a number of the motion vectors included in the motion information candidate list to be filed reaches a preset number.

16. The method according to claim 12, wherein determining the inter prediction value of the current block comprises:

determining a first prediction value of the first partition by using the first motion vector;

determining a second prediction value of the second partition by using the second motion vector;

performing GPM inter prediction on the current block by using the first prediction value and the second prediction value, and obtaining the inter prediction value of the current block.

17. The method according to claim 12, further comprising:

after obtaining a merge motion information candidate list of the current block:

generating an indicator information item that indicating a motion vector included in the merge motion information candidate list is available for the first partition and the second partition.

18. The method according to claim 12, further comprising:

before generating a GPM motion information candidate list:

obtaining a first length of the merge motion information candidate list and a syntax value of sequence parameter set;

determining a value that is twice the difference between the first length and the syntax value of sequence parameter set, and determining the determined value as a second length of the GPM motion information candidate list.

19. The method according to claim 12, further comprising:

before generating a GPM motion information candidate list:

obtaining a number of the motion vectors included in the merge motion information candidate list which cannot be used to generate a GPM motion information candidate list, and determining the obtained number as a syntax value of sequence parameter set.

20. A decoder, wherein the decoder comprising:

a memory and a processor;

the memory stores a computer program that can be run on the processor, and wherein the processor is configured to perform following operations when executing the instructions:

determining, from a bitstream, a prediction mode parameter of a current block;

obtaining a merge motion information candidate list of the current block when the prediction mode parameter indicates using a geometrical partition mode (GPM) to determine an inter prediction value of the current block, wherein the merge motion information candidate list includes one or more motion candidate information item for determining the inter prediction value of the current block, and wherein the motion candidate information item includes one or two motion vector;

generating a GPM motion information candidate list by using the motion vectors included in the motion candidate information items according to a sequence of the motion candidate information items in the merge motion information candidate list, wherein a motion candidate information item in the GPM motion information candidate list includes a motion vector;

selecting, from the GPM motion information candidate list, a first motion vector for a first partition in the current block and a second motion vector for a second partition in the current block; and determining the inter prediction value of the current block by using the first motion vector and the second motion vector.

* * * * *